(12) United States Patent
Stetson, Jr. et al.

(10) Patent No.: US 9,833,748 B2
(45) Date of Patent: Dec. 5, 2017

(54) PERFORATED GRAPHENE DEIONIZATION OR DESALINATION

(71) Applicant: LOCKHEED MARTIN CORPORATION, Bethesda, MD (US)

(72) Inventors: John B. Stetson, Jr., New Hope, PA (US); Jonathan Mercurio, Lumberton, NJ (US); Alan Rosenwinkel, Haddonfield, NJ (US); Peter V. Bedworth, Los Gatos, CA (US); Shawn P. Fleming, Lumberton, NJ (US); Aaron L. Westman, Brewerton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/332,982

(22) Filed: Oct. 24, 2016

(65) Prior Publication Data

US 2017/0036174 A1   Feb. 9, 2017

Related U.S. Application Data

(63) Continuation of application No. 13/719,579, filed on Dec. 19, 2012, now Pat. No. 9,475,709, which is a
(Continued)

(51) Int. Cl.
*B01D 61/00* (2006.01)
*B01D 61/02* (2006.01)
(Continued)

(52) U.S. Cl.
CPC .......... *B01D 71/021* (2013.01); *B01D 61/02* (2013.01); *B01D 61/027* (2013.01); *B01D 63/10* (2013.01);
(Continued)

(58) Field of Classification Search
CPC .................. B01D 53/228; B01D 53/22; B01D 2257/108; B01D 2256/16; B01D 61/02; B01D 61/027; B82Y 30/00; C02F 2103/00
(Continued)

(56) References Cited

U.S. PATENT DOCUMENTS 2,187,417 A   1/1940   Doble
3,024,153 A   3/1962   Kennedy
(Continued)

FOREIGN PATENT DOCUMENTS

CA   2037988   9/1992
CA   2411935   12/2002
(Continued)

OTHER PUBLICATIONS

Bae et al., "Roll-to-roll production of 30-inch graphene films for transparent electrodes," Nature Nanotechnology 5: 574-578 (Jun. 20, 2010).
(Continued)

*Primary Examiner* — Ana Fortuna
(74) *Attorney, Agent, or Firm* — Foley & Lardner LLP

(57) ABSTRACT

A fluid deionizer includes at least one graphene sheet perforated with apertures dimensioned to allow a flow of fluid and to disallow at least one particular type of ion contained in the flow of fluid. A purge valve is placed in an open position so as to collect the at least one particular type of ion disallowed by the graphene sheet so as to clean off the at least one graphene sheet. Another embodiment provides a deionizer with graphene sheets in cylindrical form. A separation apparatus is also provided in a cross-flow arrangement where a pressurized source directs a medium along a path substantially parallel to at least one sheet of graphene from an inlet to an outlet. The medium flows through the plural
(Continued)

perforated apertures while a remaining portion of the medium and the disallowed components in the medium flow out the outlet.

14 Claims, 7 Drawing Sheets

Related U.S. Application Data continuation-in-part of application No. 12/868,150, filed on Aug. 25, 2010, now Pat. No. 8,361,321.

(51) Int. Cl.

| | | |
|---|---|---|
| C02F 1/44 | (2006.01) | |
| B01D 63/00 | (2006.01) | |
| B01D 29/46 | (2006.01) | |
| B01D 71/02 | (2006.01) | |
| B01D 67/00 | (2006.01) | |
| B01D 63/10 | (2006.01) | |
| B01D 69/02 | (2006.01) | |
| B01D 69/10 | (2006.01) | |
| B01D 71/36 | (2006.01) | |
| B01D 71/50 | (2006.01) | |
| B82Y 30/00 | (2011.01) | |
| C02F 103/08 | (2006.01) | |

(52) U.S. Cl.
CPC ....... *B01D 67/006* (2013.01); *B01D 67/0039* (2013.01); *B01D 69/02* (2013.01); *B01D 69/10* (2013.01); *B01D 71/022* (2013.01); *B01D 71/36* (2013.01); *B01D 71/50* (2013.01); *C02F 1/442* (2013.01); *B01D 2313/18* (2013.01); *B01D 2313/24* (2013.01); *B82Y 30/00* (2013.01); *C02F 2103/08* (2013.01); *C02F 2201/005* (2013.01)

(58) Field of Classification Search
USPC .................................. 210/652, 321.75, 490
See application file for complete search history.

(56) References Cited

U.S. PATENT DOCUMENTS

| | | |
|---|---|---|
| 3,303,085 A | 2/1967 | Price et al. |
| 3,501,831 A | 3/1970 | Gordon |
| 3,593,854 A | 7/1971 | Swank |
| 3,701,433 A | 10/1972 | Krakauer et al. |
| 3,802,972 A | 4/1974 | Fleischer et al. |
| 4,073,732 A | 2/1978 | Lauer et al. |
| 4,159,954 A | 7/1979 | Gangemi |
| 4,162,220 A | 7/1979 | Servas |
| 4,277,344 A | 7/1981 | Cadotte |
| 4,303,530 A | 12/1981 | Shah et al. |
| 4,743,371 A | 5/1988 | Servas et al. |
| 4,855,058 A | 8/1989 | Holland et al. |
| 4,880,440 A | 11/1989 | Perrin |
| 4,889,626 A | 12/1989 | Browne |
| 4,891,134 A | 1/1990 | Vcelka |
| 4,925,560 A | 5/1990 | Sorrick |
| 4,935,207 A | 6/1990 | Stanbro et al. |
| 4,976,858 A | 12/1990 | Kadoya |
| 5,052,444 A | 10/1991 | Messerly et al. |
| 5,080,770 A | 1/1992 | Culkin |
| 5,156,628 A | 10/1992 | Kranz |
| 5,182,111 A | 1/1993 | Aebischer et al. |
| 5,185,086 A | 2/1993 | Kaali et al. |
| 5,201,767 A | 4/1993 | Caldarise et al. |
| 5,244,981 A | 9/1993 | Seidner et al. |
| 5,314,492 A | 5/1994 | Hamilton et al. |
| 5,314,960 A | 5/1994 | Spinelli et al. |
| 5,314,961 A | 5/1994 | Anton et al. |
| 5,331,067 A | 7/1994 | Seidner et al. |
| 5,344,454 A | 9/1994 | Clarke et al. |
| 5,371,147 A | 12/1994 | Spinelli et al. |
| 5,425,858 A | 6/1995 | Farmer |
| 5,480,449 A | 1/1996 | Hamilton et al. |
| 5,514,181 A | 5/1996 | Light et al. |
| 5,516,522 A | 5/1996 | Peyman et al. |
| 5,549,697 A | 8/1996 | Caldarise |
| 5,562,944 A | 10/1996 | Kafrawy |
| 5,565,210 A | 10/1996 | Rosenthal et al. |
| 5,580,530 A | 12/1996 | Kowatsch et al. |
| 5,595,621 A | 1/1997 | Light et al. |
| 5,636,437 A | 6/1997 | Kaschmitter et al. |
| 5,639,275 A | 6/1997 | Baetge et al. |
| 5,641,323 A | 6/1997 | Caldarise |
| 5,658,334 A | 8/1997 | Caldarise et al. |
| 5,662,158 A | 9/1997 | Caldarise |
| 5,665,118 A | 9/1997 | LaSalle et al. |
| 5,671,897 A | 9/1997 | Ogg et al. |
| 5,679,232 A | 10/1997 | Fedor et al. |
| 5,679,249 A | 10/1997 | Fendya et al. |
| 5,687,788 A | 11/1997 | Caldarise et al. |
| 5,700,477 A | 12/1997 | Rosenthal et al. |
| 5,713,410 A | 2/1998 | LaSalle et al. |
| 5,716,412 A | 2/1998 | DeCarlo et al. |
| 5,716,414 A | 2/1998 | Caldarise |
| 5,725,586 A | 3/1998 | Sommerich |
| 5,731,360 A | 3/1998 | Pekala et al. |
| 5,733,503 A | 3/1998 | Kowatsch et al. |
| 5,746,272 A | 5/1998 | Mastrorio et al. |
| 5,782,286 A | 7/1998 | Sommerich |
| 5,782,289 A | 7/1998 | Mastrorio et al. |
| 5,788,916 A | 8/1998 | Caldarise |
| 5,800,828 A | 9/1998 | Dionne et al. |
| 5,808,312 A | 9/1998 | Fukuda |
| 5,868,727 A | 2/1999 | Barr et al. |
| 5,897,592 A | 4/1999 | Caldarise et al. |
| 5,902,762 A | 5/1999 | Mercuri et al. |
| 5,906,234 A | 5/1999 | Mastrorio et al. |
| 5,910,172 A | 6/1999 | Penenberg |
| 5,910,173 A | 6/1999 | DeCarlo et al. |
| 5,913,998 A | 6/1999 | Butler et al. |
| 5,925,247 A | 7/1999 | Huebbel |
| 5,932,185 A | 8/1999 | Pekala et al. |
| 5,935,084 A | 8/1999 | Southworth |
| 5,935,172 A | 8/1999 | Ochoa et al. |
| 5,954,937 A | 9/1999 | Farmer |
| 5,974,973 A | 11/1999 | Tittgemeyer |
| 5,976,555 A | 11/1999 | Liu et al. |
| 5,980,718 A | 11/1999 | Van Konynenburg et al. |
| 6,008,431 A | 12/1999 | Caldarise et al. |
| 6,013,080 A | 1/2000 | Khalili |
| 6,022,509 A | 2/2000 | Matthews et al. |
| 6,052,608 A | 4/2000 | Young et al. |
| 6,080,393 A | 6/2000 | Liu et al. |
| 6,093,209 A | 7/2000 | Sanders |
| 6,139,585 A | 10/2000 | Li |
| 6,152,882 A | 11/2000 | Prutchi |
| 6,156,323 A | 12/2000 | Verdicchio et al. |
| 6,193,956 B1 | 2/2001 | Liu et al. |
| 6,209,621 B1 | 4/2001 | Treacy |
| 6,213,124 B1 | 4/2001 | Butterworth |
| 6,228,123 B1 | 5/2001 | Dezzani |
| 6,264,699 B1 | 7/2001 | Noiles et al. |
| 6,292,704 B1 | 9/2001 | Malonek et al. |
| 6,309,532 B1 | 10/2001 | Tran et al. |
| 6,346,187 B1 | 2/2002 | Tran et al. |
| 6,375,014 B1 | 4/2002 | Garcera et al. |
| 6,426,214 B1 | 7/2002 | Butler et al. |
| 6,454,095 B1 | 9/2002 | Brisebois et al. |
| 6,455,115 B1 | 9/2002 | Demeyer |
| 6,461,622 B2 | 10/2002 | Liu et al. |
| 6,462,935 B1 | 10/2002 | Shiue et al. |
| 6,521,865 B1 | 2/2003 | Jones et al. |
| 6,532,386 B2 | 3/2003 | Sun et al. |
| 6,580,598 B2 | 6/2003 | Shiue et al. |
| 6,654,229 B2 | 11/2003 | Yanagisawa et al. |
| 6,659,298 B2 | 12/2003 | Wong |
| 6,660,150 B2 | 12/2003 | Conlan et al. |

(56) References Cited

U.S. PATENT DOCUMENTS

| | | |
|---|---|---|
| 6,661,643 B2 | 12/2003 | Shiue et al. |
| 6,692,627 B1 | 2/2004 | Russell et al. |
| 6,695,880 B1 | 2/2004 | Roffman et al. |
| 6,699,684 B2 | 3/2004 | Ho et al. |
| 6,719,740 B2 | 4/2004 | Burnett et al. |
| 6,905,612 B2 | 6/2005 | Dorian et al. |
| 6,924,190 B2 | 8/2005 | Dennison |
| 7,014,829 B2 | 3/2006 | Yanagisawa et al. |
| 7,071,406 B2 | 7/2006 | Smalley et al. |
| 7,092,753 B2 | 8/2006 | Darvish et al. |
| 7,138,042 B2 | 11/2006 | Tran et al. |
| 7,171,263 B2 | 1/2007 | Darvish et al. |
| 7,175,783 B2 | 2/2007 | Curran et al. |
| 7,179,419 B2 | 2/2007 | Lin et al. |
| 7,190,997 B1 | 3/2007 | Darvish et al. |
| 7,267,753 B2 | 9/2007 | Anex et al. |
| 7,306,768 B2 | 12/2007 | Chiga |
| 7,357,255 B2 | 4/2008 | Ginsberg et al. |
| 7,374,677 B2 | 5/2008 | McLaughlin et al. |
| 7,381,707 B2 | 6/2008 | Lin et al. |
| 7,382,601 B2 | 6/2008 | Yoshimitsu |
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |
| 7,505,250 B2 | 3/2009 | Cho et al. |
| 7,531,094 B2 | 5/2009 | McLaughlin et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |
| 7,998,246 B2 | 8/2011 | Liu et al. |
| 8,109,893 B2 | 2/2012 | Lande |
| 8,147,599 B2 | 4/2012 | McAlister |
| 8,262,943 B2 | 9/2012 | Meng et al. |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,354,296 B2 | 1/2013 | Dimitrakopoulos et al. |
| 8,361,321 B2 * | 1/2013 | Stetson ............... B01D 61/02 210/257.2 |
| 8,449,504 B2 | 5/2013 | Carter et al. |
| 8,475,689 B2 | 7/2013 | Sun et al. |
| 8,506,807 B2 | 8/2013 | Lee et al. |
| 8,512,669 B2 | 8/2013 | Hauck |
| 8,513,324 B2 | 8/2013 | Scales et al. |
| 8,535,726 B2 | 9/2013 | Dai et al. |
| 8,592,291 B2 | 11/2013 | Shi et al. |
| 8,617,411 B2 | 12/2013 | Singh |
| 8,686,249 B1 | 1/2014 | Whitaker et al. |
| 8,666,471 B2 | 3/2014 | Rogers et al. |
| 8,697,230 B2 | 4/2014 | Ago et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,753,468 B2 | 6/2014 | Caldwell et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,861,821 B2 | 10/2014 | Osumi |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,979,978 B2 | 3/2015 | Miller et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,023,220 B2 | 5/2015 | Zurutuza Elorza et al. |
| 9,028,663 B2 | 5/2015 | Stetson et al. |
| 9,035,282 B2 | 5/2015 | Dimitrakopoulos et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,056,282 B2 | 6/2015 | Miller et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,075,009 B2 | 7/2015 | Kim et al. |
| 9,080,267 B2 | 7/2015 | Batchvarova et al. |
| 9,095,823 B2 | 8/2015 | Fleming |
| 9,096,050 B2 | 8/2015 | Bedell et al. |
| 9,096,437 B2 | 8/2015 | Tour et al. |
| 9,102,111 B2 | 8/2015 | Pugh et al. |
| 9,108,158 B2 | 8/2015 | Yu et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 9,388,048 B1 | 7/2016 | Zhou et al. |
| 9,425,709 B2 * | 8/2016 | Hayashi ............... H02N 1/08 |
| 9,463,421 B2 | 10/2016 | Fleming |
| 9,505,192 B2 | 11/2016 | Stoltenberg et al. |
| 9,567,224 B2 | 2/2017 | Bedworth |
| 9,572,918 B2 | 2/2017 | Bachmann et al. |
| 9,592,475 B2 | 3/2017 | Stoltenberg et al. |
| 9,610,546 B2 | 4/2017 | Sinton et al. |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0104435 A1 * | 8/2002 | Baker ............... B01D 53/228 95/45 |
| 2002/0115957 A1 | 8/2002 | Sun et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0146221 A1 | 8/2003 | Lauer et al. |
| 2003/0159985 A1 | 8/2003 | Siwy et al. |
| 2004/0061253 A1 | 4/2004 | Kleinmeyer et al. |
| 2004/0063097 A1 | 4/2004 | Evans |
| 2004/0099324 A1 | 5/2004 | Fraser et al. |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0199243 A1 | 10/2004 | Yodfat |
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |

(56) References Cited

U.S. PATENT DOCUMENTS

| | | |
|---|---|---|
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0126966 A1 | 6/2005 | Tanida et al. |
| 2005/0129633 A1 | 6/2005 | Lin |
| 2005/0148996 A1 | 7/2005 | Sun et al. |
| 2005/0170089 A1 | 8/2005 | Lashmore et al. |
| 2005/0189673 A1* | 9/2005 | Klug ............... B29C 70/50 264/137 |
| 2005/0226834 A1 | 10/2005 | Lambino et al. |
| 2005/0238730 A1 | 10/2005 | Le Fur et al. |
| 2006/0005381 A1 | 1/2006 | Nishi et al. |
| 2006/0036332 A1 | 2/2006 | Jennings |
| 2006/0073370 A1 | 4/2006 | Krusic et al. |
| 2006/0093885 A1 | 5/2006 | Krusic et al. |
| 2006/0121279 A1 | 6/2006 | Petrik |
| 2006/0151382 A1 | 7/2006 | Petrik |
| 2006/0166347 A1 | 7/2006 | Faulstich et al. |
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0056894 A1 | 3/2007 | Connors, Jr. |
| 2007/0060862 A1 | 3/2007 | Sun et al. |
| 2007/0062856 A1 | 3/2007 | Pahl et al. |
| 2007/0099813 A1 | 5/2007 | Luizzi et al. |
| 2007/0131646 A1 | 6/2007 | Donnelly et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0061477 A1 | 3/2008 | Capizzo |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0149561 A1 | 6/2008 | Chu et al. |
| 2008/0156648 A1 | 7/2008 | Dudziak et al. |
| 2008/0170982 A1 | 7/2008 | Zhang et al. |
| 2008/0185293 A1 | 8/2008 | Klose et al. |
| 2008/0188836 A1 | 8/2008 | Weber et al. |
| 2008/0190508 A1 | 8/2008 | Booth et al. |
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0023572 A1 | 1/2009 | Backes et al. |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0087395 A1 | 4/2009 | Lin et al. |
| 2009/0117335 A1 | 5/2009 | Iyoda et al. |
| 2009/0148495 A1 | 6/2009 | Hammer et al. |
| 2009/0176159 A1 | 7/2009 | Zhamu et al. |
| 2009/0222072 A1 | 9/2009 | Robinson et al. |
| 2009/0236295 A1 | 9/2009 | Braun et al. |
| 2009/0241242 A1 | 10/2009 | Beatty et al. |
| 2009/0283475 A1 | 11/2009 | Hylton et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0000754 A1 | 1/2010 | Mann et al. |
| 2010/0016778 A1 | 1/2010 | Chattopadhyay |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0105834 A1 | 4/2010 | Tour et al. |
| 2010/0110372 A1 | 5/2010 | Pugh et al. |
| 2010/0124564 A1 | 5/2010 | Martinson et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0196439 A1 | 8/2010 | Beck et al. |
| 2010/0209515 A1 | 8/2010 | Chantalat et al. |
| 2010/0213079 A1 | 8/2010 | Willis |
| 2010/0228204 A1 | 9/2010 | Beatty et al. |
| 2010/0233781 A1 | 9/2010 | Bangera et al. |
| 2010/0249273 A1 | 9/2010 | Scales et al. |
| 2010/0258111 A1 | 10/2010 | Shah et al. |
| 2010/0323177 A1 | 12/2010 | Ruoff et al. |
| 2010/0327847 A1 | 12/2010 | Leiber et al. |
| 2011/0014217 A1 | 1/2011 | Fahmy et al. |
| 2011/0037033 A1 | 2/2011 | Green et al. |
| 2011/0041519 A1 | 2/2011 | McAlister |
| 2011/0041687 A1 | 2/2011 | Diaz et al. |
| 2011/0045523 A1 | 2/2011 | Strano et al. |
| 2011/0054418 A1 | 3/2011 | Pugh et al. |
| 2011/0054576 A1 | 3/2011 | Robinson et al. |
| 2011/0056892 A1 | 3/2011 | Lancaster |
| 2011/0073563 A1 | 3/2011 | Chang et al. |
| 2011/0092054 A1 | 4/2011 | Seo et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0124253 A1 | 5/2011 | Shah et al. |
| 2011/0138689 A1 | 6/2011 | Wismans |
| 2011/0139707 A1 | 6/2011 | Siwy et al. |
| 2011/0152795 A1 | 6/2011 | Aledo et al. |
| 2011/0201201 A1 | 8/2011 | Arnold et al. |
| 2011/0202201 A1* | 8/2011 | Matsubara ............ B60R 25/00 701/2 |
| 2011/0240947 A1* | 10/2011 | Yang .................. H01L 45/1246 257/3 |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0263912 A1 | 10/2011 | Miller et al. |
| 2011/0269920 A1 | 11/2011 | Min et al. |
| 2012/0031833 A1 | 2/2012 | Ho et al. |
| 2012/0048804 A1 | 3/2012 | Stetson et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1* | 7/2012 | Zettl ................... B81C 99/008 428/166 |
| 2012/0186850 A1 | 7/2012 | Sugiyama et al. |
| 2012/0211367 A1 | 8/2012 | Vecitis |
| 2012/0218508 A1 | 8/2012 | Pugh et al. |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0242953 A1 | 9/2012 | Pugh et al. |
| 2012/0255899 A1 | 10/2012 | Choi et al. |
| 2012/0267337 A1 | 10/2012 | Striemer et al. |
| 2012/0292245 A1 | 11/2012 | Saito |
| 2012/0298396 A1 | 11/2012 | Hong et al. |
| 2012/0301707 A1 | 11/2012 | Kinloch et al. |
| 2013/0015136 A1 | 1/2013 | Bennett |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0100436 A1 | 4/2013 | Jackson et al. |
| 2013/0105417 A1 | 5/2013 | Stetson et al. |
| 2013/0108839 A1 | 5/2013 | Arnold et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146221 A1 | 6/2013 | Kolmakov et al. |

(56) References Cited

U.S. PATENT DOCUMENTS

| | | |
|---|---|---|
| 2013/0146480 A1 | 6/2013 | Garaj et al. |
| 2013/0152386 A1 | 6/2013 | Pandojirao-S et al. |
| 2013/0174978 A1 | 7/2013 | Pugh et al. |
| 2013/0190476 A1 | 7/2013 | Lancaster et al. |
| 2013/0192460 A1 | 8/2013 | Miller et al. |
| 2013/0192461 A1 | 8/2013 | Miller et al. |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |
| 2013/0216581 A1 | 8/2013 | Fahmy et al. |
| 2013/0240355 A1 | 9/2013 | Ho et al. |
| 2013/0240437 A1 | 9/2013 | Rodrigues et al. |
| 2013/0248097 A1 | 9/2013 | Ploss, Jr. |
| 2013/0248367 A1 | 9/2013 | Stetson et al. |
| 2013/0249147 A1 | 9/2013 | Bedworth |
| 2013/0256118 A1 | 10/2013 | Meller et al. |
| 2013/0256139 A1 | 10/2013 | Peng |
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0269819 A1 | 10/2013 | Ruby et al. |
| 2013/0270188 A1 | 10/2013 | Karnik et al. |
| 2013/0273288 A1 | 10/2013 | Luo et al. |
| 2013/0277305 A1 | 10/2013 | Stetson et al. |
| 2013/0295150 A1 | 11/2013 | Chantalat et al. |
| 2013/0309776 A1 | 11/2013 | Drndic et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0338611 A1 | 12/2013 | Pugh et al. |
| 2013/0338744 A1 | 12/2013 | Frewin et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0048411 A1 | 2/2014 | Choi et al. |
| 2014/0066958 A1 | 3/2014 | Priewe |
| 2014/0079936 A1 | 3/2014 | Russo et al. |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0151288 A1 | 6/2014 | Miller et al. |
| 2014/0151631 A1 | 6/2014 | Duesberg et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0190550 A1 | 7/2014 | Loh et al. |
| 2014/0190676 A1 | 7/2014 | Zhamu et al. |
| 2014/0190833 A1 | 7/2014 | Lieber et al. |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0212596 A1 | 7/2014 | Jahangiri-Famenini |
| 2014/0230653 A1 | 8/2014 | Yu et al. |
| 2014/0230733 A1 | 8/2014 | Miller |
| 2014/0231351 A1 | 8/2014 | Wickramasinghe et al. |
| 2014/0248621 A1 | 9/2014 | Collins |
| 2014/0257348 A1 | 9/2014 | Priewe et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1* | 9/2014 | Stoltenberg ............ B01D 69/02 210/500.25 |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0315213 A1 | 10/2014 | Nagrath et al. |
| 2014/0318373 A1 | 10/2014 | Wood et al. |
| 2014/0322518 A1 | 10/2014 | Addleman et al. |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0349892 A1 | 11/2014 | Van Der Zaag et al. |
| 2014/0350372 A1 | 11/2014 | Pugh et al. |
| 2014/0377651 A1 | 12/2014 | Kwon et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0098910 A1 | 4/2015 | Mordas et al. |
| 2015/0101931 A1 | 4/2015 | Garaj et al. |
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0170788 A1 | 6/2015 | Miller et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0202351 A1 | 7/2015 | Kaplan et al. |
| 2015/0212339 A1 | 7/2015 | Pugh et al. |
| 2015/0217219 A1 | 8/2015 | Sinsabaugh et al. |
| 2015/0218210 A1 | 8/2015 | Stetson et al. |
| 2015/0221474 A1 | 8/2015 | Bedworth |
| 2015/0231557 A1* | 8/2015 | Miller .................. B01D 53/229 95/45 |
| 2015/0247178 A1 | 9/2015 | Mountcastle et al. |
| 2015/0258254 A1 | 9/2015 | Simon et al. |
| 2015/0258498 A1 | 9/2015 | Simon et al. |
| 2015/0258502 A1 | 9/2015 | Turowski |
| 2015/0258503 A1 | 9/2015 | Sinton et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |
| 2015/0272896 A1 | 10/2015 | Sun et al. |
| 2015/0273401 A1* | 10/2015 | Miller ................ B01D 67/0037 210/500.25 |
| 2015/0309337 A1 | 10/2015 | Flitsch et al. |
| 2015/0321147 A1 | 11/2015 | Fleming et al. |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |

(56) References Cited

U.S. PATENT DOCUMENTS

| | | |
|---|---|---|
| 2015/0378176 A1 | 12/2015 | Flitsch et al. |
| 2016/0009049 A1 | 1/2016 | Stoltenberg et al. |
| 2016/0038885 A1 | 2/2016 | Hogen-Esch et al. |
| 2016/0043384 A1 | 2/2016 | Zhamu et al. |
| 2016/0058932 A1 | 3/2016 | Stetson et al. |
| 2016/0067390 A1 | 3/2016 | Simon et al. |
| 2016/0074814 A1 | 3/2016 | Park et al. |
| 2016/0074815 A1 | 3/2016 | Sinton et al. |
| 2016/0272499 A1 | 9/2016 | Zurutuza Elorza et al. |
| 2016/0282326 A1* | 9/2016 | Waduge ............ C25B 9/10 |
| 2016/0284811 A1 | 9/2016 | Yu et al. |
| 2016/0339160 A1* | 11/2016 | Bedworth ........... A61M 1/1623 |
| 2017/0032962 A1 | 2/2017 | Zurutuza Elorza et al. |
| 2017/0037356 A1 | 2/2017 | Simon et al. |
| 2017/0057812 A1 | 3/2017 | Zurutuza Elorza et al. |

FOREIGN PATENT DOCUMENTS

| | | |
|---|---|---|
| CN | 1128501 A | 8/1996 |
| CN | 101108194 A | 1/2008 |
| CN | 101428198 A | 5/2009 |
| CN | 101489653 A | 7/2009 |
| CN | 101996853 A | 3/2011 |
| CN | 102242062 A | 11/2011 |
| CN | 102344132 | 2/2012 |
| CN | 102423272 | 4/2012 |
| CN | 102592720 A | 7/2012 |
| CN | 101996853 B | 8/2012 |
| CN | 102637584 A | 8/2012 |
| CN | 103182249 A | 7/2013 |
| CN | 103603706 A | 2/2014 |
| DE | 19536560 | 3/1997 |
| DE | 10 2005 049 388 A1 | 4/2007 |
| EP | 0 364 628 A1 | 4/1990 |
| EP | 1 034 251 | 1/2004 |
| EP | 1 777 250 A1 | 4/2007 |
| EP | 1 872 812 | 1/2008 |
| EP | 2 060 286 | 5/2009 |
| EP | 2 107 120 A1 | 10/2009 |
| EP | 2 230 511 A1 | 9/2010 |
| EP | 1 603 609 | 5/2011 |
| EP | 2 354 272 | 8/2011 |
| EP | 2450096 | 5/2012 |
| EP | 2 489 520 | 8/2012 |
| EP | 2 511 002 | 10/2012 |
| EP | 2 586 473 | 5/2013 |
| EP | 2 679 540 | 1/2014 |
| EP | 2 937 313 | 10/2015 |
| EP | 3 070 053 | 9/2016 |
| EP | 3 084 398 | 10/2016 |
| EP | 1 538 2430.5 | 3/2017 |
| EP | 3 135 631 | 3/2017 |
| JP | 59-102111 | 7/1984 |
| JP | 10-510471 | 5/1995 |
| JP | 7504120 | 5/1995 |
| JP | H09-232293 A | 9/1997 |
| JP | 2001232158 | 8/2001 |
| JP | 2004-179014 | 6/2004 |
| JP | 2005-126966 | 5/2005 |
| JP | 2006188393 | 7/2006 |
| JP | 2011-168448 A | 9/2011 |
| JP | 2011-241479 | 12/2011 |
| JP | 2004-202480 | 7/2014 |
| JP | 2015-503405 | 2/2015 |
| JP | 2016-175828 | 10/2016 |
| KR | 1020110084110 | 7/2011 |
| KR | 10-2012-0022164 A | 3/2012 |
| KR | 1020120022164 A | 3/2012 |
| KR | 1020140002570 | 1/2014 |
| WO | WO-93/33901 | 3/1993 |
| WO | WO-93/12859 | 8/1993 |
| WO | WO-95/00231 | 1/1995 |
| WO | WO-97/12664 A1 | 4/1997 |
| WO | WO-98/30501 A2 | 7/1998 |
| WO | WO-00/70012 | 11/2000 |
| WO | WO-02/055539 A1 | 7/2002 |
| WO | WO-2013/115762 | 8/2003 |
| WO | WO-2004/009840 A1 | 1/2004 |
| WO | WO-2004/082733 | 9/2004 |
| WO | WO-2005/047857 A2 | 5/2005 |
| WO | WO-2007/103411 A2 | 9/2007 |
| WO | WO-2007/140252 A1 | 12/2007 |
| WO | WO-2008/008533 | 1/2008 |
| WO | WO-2009/129984 | 10/2009 |
| WO | WO-2010/006080 | 1/2010 |
| WO | WO-2010/115904 A1 | 10/2010 |
| WO | WO-2011/019686 A1 | 2/2011 |
| WO | WO-2011/046706 A1 | 4/2011 |
| WO | WO-2011/001674 | 6/2011 |
| WO | WO-2011/063458 A1 | 6/2011 |
| WO | WO-2011/075158 | 6/2011 |
| WO | WO-2011/094204 A2 | 8/2011 |
| WO | WO-2011/100458 A2 | 8/2011 |
| WO | WO-2011/138689 A2 | 11/2011 |
| WO | WO-2012/006657 A1 | 1/2012 |
| WO | WO-2012/021801 A2 | 2/2012 |
| WO | WO-2012/027148 A1 | 3/2012 |
| WO | WO-2012/028695 | 3/2012 |
| WO | WO-2012/030368 A1 | 3/2012 |
| WO | WO-2012/138671 A2 | 10/2012 |
| WO | WO-2012/142852 A1 | 10/2012 |
| WO | WO-2013/016445 A1 | 1/2013 |
| WO | WO-2013/048063 A1 | 4/2013 |
| WO | WO-2013/138137 A1 | 9/2013 |
| WO | WO-2013/138698 A1 | 9/2013 |
| WO | WO-2013/151799 | 10/2013 |
| WO | WO-2013/152179 A1 | 10/2013 |
| WO | WO-2014/084861 A1 | 6/2014 |
| WO | WO-2014/168629 A1 | 10/2014 |
| WO | PCT/US2015/018114 | 2/2015 |
| WO | WO-2015/030698 A1 | 3/2015 |
| WO | PCT/US2015/028948 | 5/2015 |
| WO | WO-2015/138736 A1 | 9/2015 |
| WO | WO-2015/138752 A1 | 9/2015 |
| WO | WO-2015/1138771 A1 | 9/2015 |
| WO | WO-2015/197217 | 12/2015 |
| WO | WO-2016/102003 | 6/2016 |

OTHER PUBLICATIONS

Cohen-Tanugi et al, "Water Desalination across Nanoporous Graphene," ACS Nano Letters 12(7): 3602-3608 (Jun. 5, 2012).

Database WPI, Week 201238, Thomson Scientific, London, GB; AN 2012-D49442.

Exhibit A as filed with Preliminary Amendment in corresponding U.S. Appl. No. 12/868,150.

First Office Action dated Jul. 30, 2014, from the State Intellectual Property Office of China for Chinese Patent Application No. 201180049184.5—Chinese and English translation.

Handbook of Nanoscience, Engineering and Technolgy (2008), Goddard et al., eds. Chapter 11 Aluru et al. (2003) "Modeling Electronics at the Nanoscale".

International Preliminary Report on Patentability for PCT/US11/47800 dated Oct. 15, 2012.

International Preliminary Report on Patentability for PCT/US2013/074942 dated Jun. 22, 2015.

International Search Report for PCT/US2011/047800 dated Jan. 5, 2012.

International Search Report for PCT/US2013/074942 dated Mar. 12, 2014.

Jiang et al., "Porous Graphene as the Ultimate Membrane for Gas Separation," Nano Letters 9(12): 4019-4024 (Sep. 23, 2009).

Karan et al., "Ultrafast Viscous Permeation of Organic Solvents Through Diamond-Like Carbon Nanosheets," Science 335: 444-447 (Jan. 27, 2012).

Kim et al., "Fabrication and Characterization of Large Area, Semiconducting Nanoperforated Graphene Materials," Nano Letters 10(4): 1125-1131 (Mar. 1, 2010).

Liu et al., "Graphene Oxidation: Thickness-Dependent Etching and Strong Chemical Doping," Nano Letters 8(7): 1965-1970 (Jun. 19, 2008).

(56) References Cited

OTHER PUBLICATIONS

Mishra et al., "Functionalized Graphene Sheets for Arsenic Removal and Desalination of Sea Water," Desalination 282: 39-45 (Nov. 1, 2011).
Morse, "Review of Kim, Myungwoong et al., Fabrication and Characterization of Large-Area, Semiconducting Nanoperforated Graphene Materials," InterNano Resources for Nanomanufacturing (2010).
Nair et al., "Unimpeded Permeation of Water Through Helium-Leak-tight Graphene-Based Membranes," Science 335: 442-444 (Jan. 27, 2012).
*Nanoporous Graphene Could Outperform Best Commercial Water Desalination Techniques;* Tanugi & Grossman; ACS 2012; Jun. 25, 2012; Weftec 2012; Sep. 29-Oct. 3.
Notice of Allowance received in corresponding U.S. Appl. No. 12/868,150.
Paul, "Creating New Types of Carbon-Based Membranes," Science 335: 413-414 (Jan. 27, 2012).
Preliminary Amendment filed in corresponding U.S. Appl. No. 12/868,150.
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Written Opinion for PCT/US11/47800 dated Jan. 5, 2012.
Written Opinion for PCT/US2013/074942 dated Mar. 12, 2014.
CN Office Action for Application No. 201380073141 dated Jun. 8, 2016.
First Office Action for Chinese Application No. 201180049184.5 dated Jul. 30, 2014.
Notice of Acceptance for Australian Application No. 2011293742 dated Jan. 13, 2016.
Notification of Grant for Chinese Application No. 201180049184.5 dated Jun. 6, 2016.
Search and Exam Report for UAE Application No. P186/13 dated Oct. 4, 2016.
Second Office Action for Chinese Application No. 20118004918.5 dated Jun. 15, 2015.
Third Office Action for Chinese Application No. 201180049184.5 dated Mar. 4, 2016.
U.S. Notice of Allowance for U.S. Appl. No. 12/868,150 dated Sep. 25, 2012.
U.S. Notice of Allowance for U.S. Appl. No. 13/719,579 dated May 20 ,2016.
U.S. Office Action for U.S. Appl. No. 13/719,579 dated Jul. 8, 2015.
U.S. Office Action for U.S. Appl. No. 13/719,579 dated May 4, 2016.
U.S. Appl. No. 14/193,007, filed Feb. 28, 2014.
U.S. Appl. No. 14/856,471, filed Sep. 16, 2015.
U.S. Appl. No. 15/099,295, filed Apr. 14, 2016.
U.S. Appl. No. 15/099,410, filed Apr. 14, 2016.
U.S. Appl. No. 15/099,420, filed Apr. 14, 2016.
U.S. Appl. No. 15/099,289, filed Apr. 14, 2016.
U.S. Appl. No. 15/099,447, filed Apr. 14, 2016.
U.S. Appl. No. 15/099,269, filed Apr. 14, 2016.
U.S. Appl. No. 15/099,239, filed Apr. 14, 2016.
U.S. Appl. No. 15/099,464, filed Apr. 14, 2016.
U.S. Appl. No. 15/099,276, filed Apr. 14, 2016.
U.S. Appl. No. 15/099,482, filed Apr. 14, 2016.
U.S. Appl. No. 15/099,056, filed Apr. 14, 2016.
U.S. Appl. No. 15/099,099, filed Apr. 14, 2016.
U.S. Appl. No. 14/656,190, filed Mar. 12, 2015.
U.S. Appl. No. 15/099,304, filed Apr. 14, 2016.
U.S. Appl. No. 15/099,588, filed Apr. 14, 2016.
U.S. Appl. No. 14/707,808, filed May 8, 2015.
U.S. Appl. No. 14/819,273, filed Aug. 5, 2015.
U.S. Appl. No. 14/856,198, filed Sep. 16, 2015, now U.S. Pat. No. 9,610,546, Apr. 4, 2017.
U.S. Appl. No. 14/754,531, filed Jun. 29, 2015.
U.S. Appl. No. 14/610,770, filed Jan. 30, 2015.
U.S. Appl. No. 14/656,657, filed Mar. 12, 2015.
U.S. Appl. No. 14/609,325, filed Jan. 29, 2015.
U.S. Appl. No. 14/656,580, filed Mar. 12, 2015.
U.S. Appl. No. 13/480,569, filed May 25, 2012, now U.S. Pat. No. 9,067,811, Jun. 10, 2015.
U.S. Appl. No. 14/843,944, filed Sep. 2, 2015.
U.S. Appl. No. 15/099,193, filed Apr. 14, 2016.
U.S. Appl. No. 15/308,351, filed Nov. 1, 2016.
U.S. Appl. No. 13/422,753, filed Mar. 16, 2012.
U.S. Appl. No. 13/795,276, filed Mar. 12, 2013, now U.S. Pat. No. 9,567,224, Feb. 14, 2017.
U.S. Appl. No. 13/804,085, filed Mar. 14, 2013, now U.S. Pat. No. 9,028,663, May 12, 2015.
U.S. Appl. No. 13/803,958, filed Mar. 14, 2013, now U.S. Pat. No. 9,463,421, Oct. 11, 2016.
U.S. Appl. No. 13/802,896, filed Mar. 14, 2013, now U.S. Pat. No. 9,095,823, Aug. 4, 2015.
U.S. Appl. No. 13/779,963, filed Feb. 28, 2013.
U.S. Appl. No. 15/289,944, filed Oct. 10, 2016.
U.S. Appl. No. 14/192,796, filed Feb. 27, 2014, now U.S. Pat. No. 9,242,865, Jan. 26, 2016.
U.S. Appl. No. 14/200,195, filed Mar. 7, 2014, now U.S. Pat. No. 9,480,952, Nov. 1, 2016.
U.S. Appl. No. 14/200,530, filed Mar. 7, 2014, now U.S. Pat. No. 9,505,192, Nov. 29, 2016.
U.S. Appl. No. 14/195,802, filed Mar. 3, 2014, now U.S. Pat. No. 9,169,575, Oct. 27, 2015.
U.S. Appl. No. 14/858,741, filed Sep. 18, 2015.
U.S. Appl. No. 15/336,545, filed Oct. 27, 2016.
U.S. Appl. No. 14/971,922, filed Dec. 16, 2015.
U.S. Appl. No. 14/686,452, filed Apr. 14, 2015.
U.S. Appl. No. 15/332,982, filed Oct. 24, 2016.
U.S. Appl. No. 13/719,579, filed Dec. 19, 2012, now U.S. Pat. No. 9,475,709, Oct. 25, 2016.
U.S. Appl. No. 12/868,150, filed Aug. 25, 2010, now U.S. Pat. No. 8,361,321, Jan. 29, 2013.
U.S. Appl. No. 13/548,539, Jul. 13, 2012, now U.S. Pat. No. 9,193,587, Nov. 24, 2015.
U.S. Appl. No. 13/923,503, filed Jun. 21, 2013, now U.S. Pat. No. 9,572,918, Feb. 21, 2017.
U.S. Appl. No. 14/031,300, filed Sep. 19, 2013.
U.S. Appl. No. 15/410,457, filed Jan. 19, 2017.
U.S. Appl. No. 14/203,655, filed Mar. 11, 2014, now U.S. Pat. No. 9,592,475, Mar. 14, 2017.
U.S. Appl. No. 14/656,335, filed Mar. 12, 2015.
U.S. Appl. No. 14/656,617, filed Mar. 12, 2015.
U.S. Appl. No. 15/589,135, filed May 8, 2017.
Adiga et al., "Nanoporous Materials for Biomedical Devices," JOM 60: 26-32 (Mar. 25, 2008).
Agenor et al., "Renal tubular dysfunction in human visceral leishmaniasis (Kala-azar)," Clinical Nephrology 71(5): 492-500 (May 2009) (available online Mar. 21, 2011).
Albert et al., "Ringer's lactate is compatible with the rapid infusion of AS-3 preserved packed red blood cells," Can. J. Anaesth. 56(5): 352-356 (May 2009) (available online Apr. 2, 2009).
Allen et al., "Craters on silicon surfaces created by gas cluster ion impacts," Journal of Applied Physics, 92(7): 3671-3678 (Oct. 1, 2002).
Alvarenga, "Carbon nanotube materials for aerospace wiring" Rochester Institute of Technology, 2010.
AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.
AMI Applied Membranes Inc., "Filmtec Nanofiltration Membrane Elements", Retrieved from appliedmembranes.com/nanofiltration_elements.htm, accessed Apr. 28, 2015 (2 Pages).
Apel, P. "Track etching technique in membrane technology." Radiation Measurements 34.1 (2001): 559-566.

(56) References Cited

OTHER PUBLICATIONS

Aso et al., "Comparison of serum high-molecular weight (HMW) adiponectin with total adiponectin concentrations in type 2 diabetic patients with coronary artery using a novel enzyme-linked immunosorbent assay to detect HMW adiponectin," Diabetes 55(7): 1954-1960 (Jul. 2006).
Atmeh et al., "Albumin Aggregates: Hydrodynamic Shape and Physico-Chemical Properties," Jordan Journal of Chemistry, 2(2): 169-182 (Accepted Jul. 29, 2007).
AU Examination Report for Australian Patent Application No. 2013235234, dated Jan. 13, 2017, 4 pages.
AU Examination Report for Australian Patent Application No. 2013363283, dated Jun. 20, 2017, 4 pages.
Axelsson et al., "Acute hyperglycemia induces rapid, reversible increases in glomerular permeability in nondiabetic rats," Am. J. Physiol. Renal Physiol. 298(6): F1306-F1312 (Jun. 2010) (available online Mar. 17, 2010).
Bai et al., "Graphene nanomesh," Nature Nanotechnology 5: 190-194 (Feb. 14, 2010).
Bains et al., "Novel lectins from rhizomes of two *Acorus* species with mitogenic activity and inhibitory potential towards murine cancer cell lines," Int'l Immunopharmacol. 5(9): 1470-1478 (Aug. 2005) (available online May 12, 2005).
Baker, "Membrane Technology and Applications", Membrane Technology and Applications; Apr. 14, 2004; pp. 92-94.
Baker, "Track-etch Membranes," Membrane Technology and Applications 2: 92-9 (published online Dec. 2004).
Barreiro et al. "Transport properties of graphene in the high-current limit." Physical review letters 103.7 (2009): 076601.
Barreiro et al. "Understanding the catalyst-free transformation of amorphous carbon into graphene by current-induced annealing," Scientific Reports, 3 (Article 1115): 1-6 (Jan. 23, 2013).
Bazargani et al. "Low molecular weight heparin improves peritoneal ultrafiltration and blocks complement and coagulation," Peritoneal Dialysis Int'l 25(4): 394-404 (Jul. 2005-Aug. 2005).
Bazargani, "Acute inflammation in peritoneal dialysis: experimental studies in rats. Characterization of regulatory mechanisms," Swedish Dental J. Supp. 171: 1-57, i (2005).
Beppu et al., "Antidiabetic effects of dietary administration of Aloe arborescens Miller components on multiple low-dose streptozotocin-induced diabetes in mice: investigation on hypoglycemic action and systemic absorption dynamics of aloe components," J. Ethnopharmacol. 103(3): 468-77 (Feb. 20, 2006) (available online Jan. 6, 2006).
Bieri et al. "Two-dimensional Polymer Formation on Surfaces: Insight into the Roles of Precursor Mobility and Reactivity" JACS, 2010, vol. 132, pp. 16669-16676.
Botari et al., "Graphene healing mechanisms: A theoretical investigation," Carbon, 99: 302-309 (Apr. 2016) (published online Dec. 12, 2015).
Bruin et al., "Maturation and function of human embryonic stem cell-derived pancreatic progenitors in macroencapsulation devices following transplant into mice", Diabetologia (2013), vol. 56: 1987-1998 (Jun. 16, 2013).
Butler et al. "Progress, Challenges, and Opportunities in Two-Dimensional Materials Beyond Graphene", Materials Review 7(4): 2898-2926 (Mar. 6, 2013).
Chen et al., "Defect Scattering in Graphene," Physical Review Letters, 102: 236805-1-236805-4 (Jun. 12, 2009).
Chen et al., "Mechanically Strong, Electrically Conductive, and Biocompatible Graphene Paper," Adv. Mater., 20(18): 3557-3561 (Sep. 2008) (available online Jul. 23, 2008).
Chen et al., "Self-healing of defected graphene," Applied Physics Letters, 102(10): 103107-1-103107-5 (Mar. 13, 2013).
Cheng et al., "Ion Transport in Complex Layered Graphene-Based Membranes with Tuneable Interlayer Spacing," Science Advances 2(2): 1501272 (Feb. 12, 2016).
Chhowalla et al., "The chemistry of two-dimensional layered transition metal dichalcogenide nanosheets," Nature Chemistry 5: 263-275 (Mar. 20, 2013).
Childres et al., "Effect of oxygen plasma etching on graphene studied using Raman spectroscopy and electronic transport measurements," New Journal of Physics 13, 1-12 (Feb. 10, 2011).
Chu Ju, et al. "Modern Biotechnology" East China University of Technology Press, (Sep. 2007), vol. 1; pp. 306-307, ISBN 978-7-5628-2116-8.
Clochard, "Radiografted track-etched polymer membranes for research and application" [Scholarly project], in Laboratoire Des Solides Irradiés, (undated), Retrieved Jun. 2, 2016, from http://iramis.cea.fr/radiolyse/5juin2015/Clochard.pdf.
Clochard, "Track-Etched Polymer Membranes," Laboratory of Irradiated Solids, Ecole Polytechnique, retrieved from http://www.lsi.polytechnique.fr/home/research/physics-and-chemistry-of-nano-objects/trac . . . , Accessed Jul. 30, 2015 (2 pages).
CN Office Action for Chinese Application No. 201380014845.X dated Jul. 8, 2016.
CN Office Action for Chinese Application No. 201380014845.X dated Sep. 2, 2015.
CN Office Action for Chinese Application No. 201380019165.5 dated Aug. 25, 2015.
CN Office Action for Chinese Application No. 201380073141.X dated Mar. 21, 2017.
CN Office Action for Chinese Application No. 201480015372.X dated Aug. 2, 2016.
CN Office Action for Chinese Application No. 201380014845.X dated Dec. 23, 2016.
CN Office Action for Chinese Application No. 201380017644.5 dated Feb. 7, 2017.
CN Office Action for Chinese Application No. 201380017644.5 dated May 26, 2016.
CN Office Action for Chinese Application No. 201380017644.5 dated Sep. 29, 2015.
CN Office Action in Chinese Application No. 201380013988.9 dated Aug. 18, 2016 (English translation not readily available).
CN Office Action in Chinese Application No. 201380013988.9 dated Oct. 27, 2015.
Cohen-Tanugi, "Nanoporous graphene as a water desalination membrane," (Ph.D. Thesis, Massachusetts Institute of Technology) (Jun. 2015).
Colton, "Implantable biohybrid artificial organs," Cell Transplantation 4(4): 415-436 (Mar. 28, 1995).
Crock et al., "Polymer Nanocomposites with Graphene-Based Hierarchical Fillers as Materials for Multifunctional Water Treatment Membranes." Water Research 47(12): 3984-3996 (Aug. 2013; first published online Mar. 29, 2013).
Daniel et al. "Implantable Diagnostic Device for Cancer Monitoring." Biosens Bioelectricon. 24(11): 3252-3257 (Jul. 15, 2009).
De Lannoy et al., "Aquatic Biofouling Prevention by Electrically Charged Nanocomposite Polymer Thin Film Membranes", 2013 American Water Work Association membrane Technology Conference; Environmental science & technology 47.6 (2013): 2760-2768.
Deng et al., "Renal protection in chronic kidney disease: hypoxia-inducible factor activation vs. angiotensin II blockade," Am. J. Physiol. Renal Physiol. 299(6): F1365-F1373 (Dec. 2010) (available online Sep. 29, 2010).
Desai et al., "Nanoporous microsystems for islet cell replacement," Advanced Drug Delivery Reviews 56: 1661-1673 (Jul. 23, 2004).
Dong et al., "Growth of large-sized graphene thin-films by liquid precursor-based chemical vapor deposition under atmospheric pressure," Carbon 49(11): 3672-3678 (May 7, 2011).
Edwards, "Large Sheets of Graphene Film Produced for Transparent Electrodes (w/ Video)"; (Jun. 21, 2010), PhysOrg.com, retrieved on May 15, 2017 from https://phys.org/news/2010-06-large-sheets-graphene-transparentelectrodes.html (2 pages).
EP Office Action for European Application No. 13715529.7 dated Jun. 24, 2016.
Fayerman, "Canadian scientists use stem cells to reverse diabetes in mice", The Telegraph-Journal (New Brunswick), 1-2 (Jun. 29, 2012).
Fayerman, "Diabetes reversed in mice; University of B.C. scientists use embryonic stem cells to deal with Type 1 disease", The Vancouver Sun (British Columbia), 1-2 (Jun. 28, 2012).

(56) References Cited

OTHER PUBLICATIONS

Fejes et al. "A review of the properties and CVD synthesis of coiled carbon nanotubes." Materials 3.4 (2010): 2618-2642.
Fischbein et al., "Electron beam nanosculpting of suspended graphene sheets," Applied Physics Letters 93(113107): 1-3, (Sep. 16, 2008).
Fissell et al., "High-Performance Silicon Nanopore Hemofiltration Membranes," NIH-PA Author Manuscript, PMC, (Jan. 5, 2010), also published in J. Memb. Sci. 326(1): 1-15 (Jan. 5, 2009).
Franzen, C. "MIT Setting Up Industrial-Scale Graphene Printing Press" Sep. 23, 2011, retrieved from http://talkingpointsmemo.com/idealab/mit-setting-up-industrial-scale-graphene-printing-press (2 pages).
Freedman et al., "Genetic basis of nondiabetic end-stage renal disease," Semin. Nephrol. 30(2): 101-110 (Mar. 2010).
Fuertes, "Carbon composite membranes from Matrimid® and Kapton® polyimides for gas separation," Microporous and Mesoporous Materials, 33: 115-125 (Jun. 16, 1999).
Galashev, "Computer study of the removal of Cu from the graphene surface using Ar clusters," Computational Materials Science, 98: 123-128 (Feb. 2015) (available online Nov. 3, 2014).
Garcia-Lopez et al., "Determination of high and low molecular weight molecules of icodextrin in plasma and dialysate, using gel filtration chromatography, in peritoneal dialysis patients," Peritoneal Dialysis Int'l 25(2): 181-191 (Mar. 2005-Apr. 2005).
Georgakilas et al., "Functionalization of Graphene: Covalent and Non-Covalent Approaches, Derivatives and Applications," Chem. Rev., (2012) 112(11), pp. 6156-6214.
Gimi et al., "A Nanoporous, Transparent Microcontainer for Encapsulated Islet Therapy," J. Diabetes Sci. Tech. 3(2): 1-7 (Mar. 2009).
Gnudi "Molecular mechanisms of proteinuria in diabetes," Biochem. Soc. Trans. 36(5): 946-949 (Oct. 2008).
Gotloib et al., "Peritoneal dialysis in refractory end-stage congestive heart failure: a challenge facing a no-win situation," Nephrol. Dialysis. Transplant. 20(Supp. 7): vii32-vii36 (Jul. 2005).
Han et al., "Ultrathin Graphene Nanofiltration Membrane for Water Purification." Advanced Functional Materials 23(29): 3693-3700 (Aug. 1, 2013).
Harvey "Carbon as conductor: a pragmatic view." Proceedings of the 61st IWCS Conference, http://www.iwcs.org/archives/56333-iwcs-2012b-1.1584632. vol. 1. 2012.
Hashimoto et al. "Direct evidence for atomic defects in graphene layers." Nature 430.7002 (2004): 870-873.
He, et al. "The attachment of Fe3 O4 nanoparticles to graphene oxide by covalent bonding." Carbon 48.11 (2010): 3139-3144.
Hone et al. "Graphene has record-breaking strength" Physicsworld.com, Jul. 17, 2008.
Hong et al., "Graphene multilayers as gates for multi-week sequential release of proteins from surfaces," NIH-PA Author Manuscript PMC (Jun. 1, 2014), also published in ACS Nano, 6(1): 81-88 (Jan. 24, 2012) (available online Dec. 2011).
Hu et al., "Enabling graphene oxide nanosheets as water separation membranes," Environmental Science & Technology 47(8): 3715-3723 (Mar. 14, 2013).
Huang et al., "Gene expression profile in circulating mononuclear cells afterexposure to ultrafine carbon particles," Inhalation Toxicol. 22(10): 835-846 (Aug 2010).
Humplik, et al. "Nanostructured materials for water desalination." Nanotechnology 22.29 (2011): 292001.
International Search Report and Written Opinion in PCT/US2015/028948 dated Jul. 16, 2015.
International Search Report and Written Opinion dated Dec. 20, 2016 from related PCT application PCT/US2016/052010.
International Search Report and Written Opinion dated Jan. 13, 2017 from related PCT application PCT/US2016/027583.
International Search Report and Written Opinion dated Jan. 13, 2017 from related PCT application PCT/US2016/027594.
International Search Report and Written Opinion dated Jan. 13, 2017 from related PCT application PCT/US2016/027631.
International Search Report and Written Opinion dated Jan. 5, 2012 for related International Application No. PCT/US11/47800.
International Search Report and Written Opinion dated Jan. 6, 2017 from related PCT application PCT/US2016/027590.
International Search Report and Written Opinion dated Jan. 9, 2017 from related PCT application PCT/US2016/027628.
International Search Report and Written Opinion dated Jul. 5, 2017 from related PCT application PCT/US2017/024147.
International Search Report and Written Opinion for PCT Application No. PCT/US2014/023027 dated Jun. 26, 2014.
International Search Report and Written Opinion in International Application No. PCT/US2013/030344 dated Jun. 19, 2013.
International Search Report and Written Opinion in International Application No. PCT/US2013/033035 dated Jun. 28, 2013.
International Search Report and Written Opinion in International Application No. PCT/US2013/033400, dated Jun. 28, 2013.
International Search Report and Written Opinion in International Application No. PCT/US2013/033403 dated Jun. 28, 2013.
International Search Report and Written Opinion in PCT/US2014/041766, dated Sep. 30, 2014.
International Search Report and Written Opinion in PCT/US2016/027632 dated Jan. 9, 2017.
International Search Report and Written Opinion dated Jun. 5, 2014 in International Application No. PCT/US2014/021677.
International Search Report and Written Opinion dated Jun. 6, 2014 in International Application No. PCT/US2014/023043.
International Search Report and Written Opinion dated Dec. 16, 2014, for International Application No. PCT/US2014/051011.
International Search Report and Written Opinion dated Jun. 19, 2015, in International Application No. PCT/US2015/020287.
International Search Report and Written Opinion of the International Searching Authority dated Apr. 30, 2015, from related PCT application PCT/US2015/013805.
International Search Report and Written Opinion of the International Searching Authority dated Jul. 20, 2015, from related PCT application PCT/US15/13599.
International Search Report and Written Opinion of the International Searching Authority dated Jul. 22, 2016, from related PCT application PCT/US2016/027596.
International Search Report and Written Opinion of the International Searching Authority dated Jul. 22, 2016, from related PCT application PCT/US2016/027603.
International Search Report and Written Opinion of the International Searching Authority dated Jul. 22, 2016, from related PCT application PCT/US2016/027607.
International Search Report and Written Opinion of the International Searching Authority dated Jul. 22, 2016, from related PCT application PCT/US2016/027610.
International Search Report and Written Opinion of the International Searching Authority dated Jul. 22, 2016, from related PCT application PCT/US2016/027612.
International Search Report and Written Opinion of the International Searching Authority dated Jul. 22, 2016, from related PCT application PCT/US2016/027616.
International Search Report and Written Opinion of the International Searching Authority dated Jun. 10, 2015, from related PCT application PCT/US2015/020246.
International Search Report and Written Opinion of the International Searching Authority dated Jun. 17, 2015, from related PCT application PCT/US2015/020296.
International Search Report and Written Opinion of the International Searching Authority dated Jun. 22, 2016, from related PCT application PCT/US2016/027637.
International Search Report and Written Opinion of the International Searching Authority dated Jun. 3, 2015, from related PCT application in PCT/US 2015/018114.
International Search Report and Written Opinion of the International Searching Authority dated Oct. 6, 2015, from related PCT application in PCT/US2015/029932.
International Search Report dated Dec. 27, 2016 from related PCT application PCT/US2016/052007.
International Search Report dated Dec. 4, 2015, in related PCT application PCT/US2015/048205.

(56) References Cited

OTHER PUBLICATIONS

International Search Report dated Jun. 10, 2015, from related PCT application PCT/US2015/020201.
International Search Report Dec. 8, 2016 from related PCT application PCT/US2016/027629.
International Search Report for PCT Application No. PCT/US2015/018114 dated Jun. 3, 2015.
Inui et al. "Molecular dynamics simulations of nanopore processing in a graphene sheet by using gas cluster ion beam." Applied Physics A: Materials Science & Processing 98.4 (2010): 787-794.
Inui et al., "Molecular dynamics simulations of nanopore processing in a graphene sheet by using gas cluster ion beam," Appl. Phys. A, 98: 787-794 (available online Dec. 19, 2009).
Israelachvili, "Intermolecular and Surface Forces," 3rd ed., Chap. 7.1, Sizes of Atoms, Molecules, and Ions, 2011, 1 page.
Jiao et al., "Castration differentially alters basal and leucine-stimulated tissue protein synthesis in skeletal muscle and adipose tissue," Am. J. Physiol. Endocrinol. Metab. 297(5): E1222-1232 (Nov. 2009) (available online Sep. 15, 2009).
Joshi et al., "Precise and ultrafast molecular sieving through graphene oxide membranes", Science 343(6172): 752-754 (Feb. 14, 2014).
JP Office Action in Japanese Application No. 2015-501729 dated Dec. 9, 2016 (English translation).
JP Office Action in Japanese Application No. 2015-501729 dated Jun. 20, 2017 (English translation).
JP Office Action in Japanese Application No. 2015-501867 dated Oct. 11, 2016 (English translation).
JP Office Action in Japanese Application No. 2015-503405 dated Nov. 14, 2016 (English translation).
JP Office Action in Japanese Application No. 2015-503406 dated Dec. 6, 2016(English translation).
JPH09232293 Machine Translation Jap to Eng.
Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 1-13(Mar. 1, 2010).
Kang et al., "Effect of eplerenone, enalapril and their combination treatment on diabetic nephropathy in type II diabetic rats," Nephrol. Dialysis Transplant. 24(1): 73-84 (Jan. 2009).
Kang et al., "Efficient Transfer of Large-Area Graphene Films onto Rigid Substrates by Hot Pressing," American Chemical Society Nano, 6(6): 5360-5365(May 28, 2012).
Kar et al., "Effect of glycation of hemoglobin on its interaction with trifluoperazine," Protein J. 25(3): 202-211 (Apr. 2006) (available online Jun. 6, 2006).
Kawamoto et al., "Serum high molecular weight adiponectin is associated with mild renal dysfunction in Japanese adults," J. Atherosclerosis Thrombosis 17(11): 1141-1148 (Nov. 27, 2011).
Khun et al. "From Microporous Regular Frameworks to Mesoporous Materials with Ultrahigh Surface Area: Dynamic reorganization of Porous Polymer Networks" JACS, 2008; vol. 130; pp. 13333-13337.
Kim et al., "The structural and electrical evolution of graphene by oxygen plasma-induced disorder," Nanotechnology IOP 20(375703): 1-8 (Aug. 26, 2009).
Kjeldsen, T., "Yeast secretory expression of insulin precursors," Appl Microbiol Biotechnol, 54: 277-286 (May 2, 2000).
Koh et al,. "Sensitive NMR Sensors Detect Antibodies to Influenza," NIH PA Author Manuscript PMC (Apr. 13, 2009), also published in Angew. Chem. Int'l. Engl, 47(22): 4119-4121 (May 19, 2008) (available online Apr. 21, 2008).
Koski et al., "The New Skinny in Two-Dimensional Nanomaterials", ACS Nano 7(5): 3739-3743 (May 16, 2013).
Krupka et al., "Measurements of the Sheet Resistance and Conductivity of Thin Epitaxial Graphene and SiC Films" Applied Physics Letters 96, 082101-I; Feb. 23, 2010.
Kumar et al., "Modulation of alpha-crystallin chaperone activity in diabetic rat lens by curcumin," Molecular Vision 11: 561-568 (Jul. 26, 2005).
Kurapati et al., "Graphene oxide based multilayer capsules with unique permeability properties: facile encapsulation of multiple drugs," Chemical Communications 48: 6013-6015 (Apr. 25, 2012).
Lathuiliere et al., "Encapsulated Cellular Implants for Recombinant Protein Delivery and Therapeutic Modulation of the Immune System," Journal of Applied Physics, Int. J. Mol. Sci., 16: 10578-10600 (May 8, 2015).
Lee, et al. "Measurement of the elastic properties and intrinsic strength of monolayer graphene." science 321.5887 (2008): 385-388.
Lehtinen et al., "Cutting and controlled modification of graphene with ion beams," Nanotechnology, 22: 175306 1-13 (Feb. 3, 2011).
Li et al., "3D graphene oxide-polymer hydrogel: near-infrared light-triggered active scaffold for reversible cell capture and on-demand release," Advanced Materials 25: 6737-6743 (Dec. 2014) (available online Oct. 7, 2013).
Lin et al., "A Direct and Polymer-Free Method for Transferring Graphene Grown by Chemical Vapor Deposition to Any Substrate," ACSNANO, 8(2): 1784-1791 (Jan. 28, 2014).
Liu et al. "Synthesis of high-quality monolayer and bilayer graphene on copper using chemical vapor deposition," Carbon, 49(13): 4122-4130 (Nov. 2011) (published online May 30, 2011).
Liu et al., "Atomically Thin Molybdenum Disulfide Nanopores with High Sensitivity for DNA Translocation," ACS Nano 8(3): 2504-2511 (Feb. 18, 2014).
Lucchese et al. "Quantifying ion-induced defects and Raman relaxation length in graphene." Carbon 48.5 (2010): 1592-1597.
MacLeod et al. "Supramolecular Orderinng in Oligothiophene-Fullerene Monolayers" JACS, 2009, vol. 131, pp. 16844-16850.
Marquardt et al., "Hybrid materials of platinum nanoparticles and thiol-functionalized graphene derivatives," Carbon 66: 285-294 (Jan. 2014) (available online Sep. 12, 2013).
Matteucci et al., "Transport of gases and Vapors in Glass and Rubbery Polymers," in Materials Science of Membranes for Gas and Vapor Separation. (Yampolskii et al., eds. 2006) (available online Jun. 2006).
Mattevi et al. "A review of chemical vapour deposition of graphene on copper." Journal of Materials Chemistry 21.10 (2011): 3324-3334.
Miao et al. "Chemical vapor deposition of grapheme" INTECH Open Access Publisher, 2011.
MIT/MTL Center for Graphene Devices and 2D Systems, retrieved from: http://www-mtl.mit.edu/wpmu/graphene/ [retrieved from Aug. 21, 2014 archive] (3 pages).
MIT/MTL Center for Graphene Devices and 2D Systems, retrieved from: http://www-mtl.mit.edu/wpmu/graphene/ [retrieved from Mar. 4, 2015 archive] (3 pages).
Nafea, et al. "Immunoisolating semi-permeable membranes for cell encapsulation: focus on hydrogels." J Control Release. 154(2): 110-122 (Sep. 5, 2011).
Nam et al., "Monodispersed PtCo nanoparticles on hexadecyltrimethylammonium bromide treated graphene as an effective oxygen reduction reaction catalyst for proton exchange membrane fuel cells," Carbon, 50: 3739-3747 (Aug. 2012) (available online Apr. 2012).
Nandamuri et al., "Chemical vapor deposition of graphene films," Nanotechnology 21(14): 145604 (4 pages) (Apr. 2010) (available online Mar. 10, 2010).
Nayini et al., "Synthesis and characterization of functionalized carbon nanotubes with different wetting behaviors and their influence on the wetting properties of carbon nanotubes/polymethylmethacrylate coatings," Progress in Organic Coatings 77(6): 1007-1014 (Feb. 25, 2014).
Nezlin, "Circulating non-immune IgG complexes in health and disease," Immunol. Lett. 122(2); 141-144 (Feb. 21, 2009) (available online Feb. 2, 2009).
Norata et al., "Plasma adiponectin levels in chronic kidney disease patients: relation with molecular inflammatory profile and metabolic status," Nutr. Metab. Cardiovasc. Dis. 20(1): 56-63 (Jan. 2010) (available online Apr. 9, 2009).
Notice of Allowance dated Oct. 7, 2016, from related U.S. Appl. No. 13/795,276.

(56) References Cited

OTHER PUBLICATIONS

Ogawa et al., "Exosome-like vesicles in Gloydius blomhoffii blomhoffii venom," Toxicon 51(6): 984-993 (May 2008) (available online Feb. 19, 2008).
O'Hern et al. "Selective Molecular Transport through Intrinsic Defects in a Single Layer of CVD Graphene," ACS Nano, 6(11): 10130-10138 (Oct. 2, 2012).
O'Hern et al., "Development of process to transfer large areas of LPCVD graphene from copper foil to a porous support substrate," 1-62 (M.S. Thesis, Massachusetts Institute of Technology, Thesis) (Sep. 2011).
O'Hern et al., "Nanofiltration across defect-sealed nanoporous monolayer graphene," Nano Letters, 15(5): 3254-3260 (published Apr. 27, 2015).
O'Hern et al., "Selective Ionic Transport through Tunable Subnanometer Pores in Single-Layer Graphene Membranes," Nano Letters 14(3): 1234-1241 (Feb. 3, 2014).
Ohgawara et al. "Assessment of pore size of semipermeable membrane for immunoisolation on xenoimplatntation of pancreatic B cells using a diffusion chamber." Transplant Proc. (6): 3319-3320. 1995.
Oki et al., "Combined acromegaly and subclinical Cushing disease related to high-molecular-weight adrenocorticotropic hormone," J. Neurosurg. 110(2): 369-73 (Feb. 2009).
Osorio et al., "Effect of treatment with Iosartan on salt sensitivity and SGLT2 expression in hypertensive diabetic rats," Diabetes Res. Clin. Pract. 86(3): e46-e49 (Dec. 2009) (available online Oct. 2, 2009).
Osorio et al., "Effect of phlorizin on SGLT2 expression in the kidney of diabetic rats," J. Nephrol. 23(5): 541-546 (Sep.-Oct. 2010).
Padidela et al., "Elevated basal and post-feed glucagon-like peptide 1 (GLP-1) concentrations in the neonatal period," Eur. J. Endocrinol. 160(1): 53-58 (Jan. 2009) (available online Oct. 24, 2008).
Pall Corporation, "Pall Water Processing Disc-Tube Filter Technology", Retrieved on Feb. 10, 2015, Retrieved from http://www.pall.com/pdfs/Fuels-and-Chemicals/Disc-Tube_Filter_Technoloqy-DT100b.pdF (15 Pages).
Plant et al. "Size-dependent propagation of Au nanoclusters through few-layer grapheme," The Royal Society of Chemistry 2013, Nanoscale.
Plant et al. "Size-dependent propagation of Au nanoclusters through few-layer graphene," Nanoscale, 6: 1258-1263 (2014) (available online Oct. 27, 2013).
Pollard, "Growing Graphene via Chemical Vapor Department of Physics, Pomona College; May 2, 2011.
Popok. "Cluster Ion Implantation in Graphite and Diamond: Radiation Damage and Stopping of Cluster Constituents," Reviews on Advanced Materials Science, 38(1): 7-16 (Jan. 21, 2014).
Rafael et al. "Cell Transplantation and Immunoisolation: Studies on a macroencapsultaion device." From the Departments of Transplantation Pathology: Stockholm, Sweden (1999).
Rezania et al., "Enrichment of Human Embryonic Stem Cell-Derived NKX6.1-Expressing Pancreatic Progenitor Cells Accelerates the Maturation of Insulin-Secreting Cells In Vivo", Stem Cells Regenerative Medicine, vol. 31: 2432-2442 (Jul. 29, 2013).
Rezania et al., "Maturation of Human Embryonic Stem Cell-Derived Pancreatic Progenitors Into Functional Islets Capable of Treating Pre-existing Diabetes in Mice", Diabetes Journal, vol. 61: 2016-2029 (Aug. 1, 2012).
Ribeiro et al., "Binary Mutual Diffusion Coefficients of Aqueous Solutions of Sucrose, Lactose, Glucose, and Fructose in the Temperature Range from (298.15 to 328.15) K," J. Chem. Eng. Data 51(5): 1836-1840 (Sep. 2006) (available online Jul. 20, 2006).
Rippe et al., "Size and charge selectivity of the glomerular filter in early experimental diabetes in rats," Am. J. Physiol. Renal Physiol. 293(5): F1533-F1538 (Nov. 2007)(available online Aug. 15, 2007).
Russo et al., "Atom-by-atom nucleation and growth of graphene nanopores," PNAS 109(16): 5953-5957 (Apr. 17, 2012).
SA Final Rejection for Saudi Arabia Application No. 113340400 dated Jan. 28, 2016.
SA First Examination Report for Saudi Arabia Application No. 113340401 dated Apr. 28, 2015.
Sa First Examination Report for Saudi Arabia Application No. 113340424 dated May 10, 2015.
SA First Examination Report for Saudi Arabia Application No. 113340426 dated May 12, 2015.
SA First Examination Report in Saudi Arabia Application No. 113340400 dated Apr. 13, 2015.
SA Second Examination Report for Saudi Arabia Application No. 113340400 dated Aug. 11, 2015.
Sanchez, et al. "Biological Interactions of Graphene-Family Nanomaterials—An Interdisciplinary Review." Chem Res Toxicol. 25(1): 15-34 (Jan. 13, 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sethna et al., "Serum adiponectin levels and ambulatory blood pressure monitoring in pediatric renal transplant recipients," Transplantation 88(8): 1030-1037 (Oct. 27, 2009).
Sullivan et al., "Microarray analysis reveals novel gene expression changes associated with erectile dysfunction in diabetic rats," Physiol. Genom. 23(2): 192-205 (Oct. 17, 2005) (available online Aug. 23, 2005).
Sun et al., "Growth of graphene from solid carbon sources," Nature 468(7323): 549-552 (Nov. 25, 2010; including corrigendum in Nature 471(7336): 124 (Mar. 3, 2011).
Swett et al, "Imagining and Sculpting Graphene on the atomic scale" Oak Ridge National Laboratory's (ORNL) Center for Nanophase Materials Sciences (CNMS) Biannual Review. 1 page.
Swett et al, "Supersonic Nanoparticle Interaction with Suspended CVD Graphene", Microsc. Microanal. 22 (Suppl 3): 1670-1671 (Jul. 25, 2016).
Takata et al., "Hyperresistinemia is associated with coexistence of hypertension and type 2 diabetes," Hypertension 51. 2 (Feb 2008): 534-9.
Tamborlane et al., "Continuous Glucose Monitoring and Intensive Treatment of Type 1 Diabetes" N Engl J Med 359;14: 1464-1476 (Oct. 2, 2008).
Tan et al., "Beta-cell regeneration and differentiation: how close are we to the 'holy grail'?" J. Mol. Encodrinol. 53(3): R119-R129 (Oct. 9, 2014).
Tang et al., "Highly wrinkled cross-linked graphene oxide membranes for biological and charge-storage applications," Small 8(3): 423-431 (Feb. 2012) (available online Dec. 13, 2011).
Totani et al. "Gluten binds cytotoxic compounds generated in heated frying oil." Journal of oleo science 57.12 (2008): 683-690.
Tsukamoto et al. "Purification, characterization and biological activities of a garlic oliqosaccharide," Journal of UOEH 30.2 (Jun. 1, 2008): 147-57.
TW Office Action in Taiwanese Application No. 102146079 dated Apr. 14, 2017. 9 Pages.(English translation).
TW Search Report in Taiwanese Application No. 102146079 dated Apr. 14, 2017, 1 page.
UMEA Universitet "Graphene nanoscrolls are formed by decoration of magnetic nanoparticles." ScienceDaily. Aug. 15, 2013. https://www.sciencedaily.com/releases/2013/08/130815084402.htm (3 pages).
United Arab Emirates Search and Exam Report.
U.S. Notice of Allowance for U.S. Appl. No. 13/548,539 dated Aug. 18, 2015.
U.S. Notice of Allowance for U.S. Appl. No. 13/548,539 dated Jul. 23, 2015.
U.S. Notice of Allowance for U.S. Appl. No. 13/795,276 dated Oct. 7, 2016.
U.S. Notice of Allowance for U.S. Appl. No. 13/802,896 dated Apr. 1, 2015.
U.S. Notice of Allowance for U.S. Appl. No. 13/803,958 dated Aug. 29, 2016.
U.S. Notice of Allowance for U.S. Appl. No. 13/803,958 dated Jun. 2, 2016.

(56) References Cited

OTHER PUBLICATIONS

U.S. Notice of Allowance for U.S. Appl. No. 13/803,958 dated Sep. 12, 2016.
U.S. Notice of Allowance for U.S. Appl. No. 13/804,085 dated Jan. 15, 2015.
U.S. Notice of Allowance for U.S. Appl. No. 13/804,085 dated Mar. 12, 2015.
U.S. Notice of Allowance for U.S. Appl. No. 13/923,503 dated Oct. 14, 2016.
U.S. Notice of Allowance for U.S. Appl. No. 13/923,503 dated Oct. 5, 2016.
U.S. Notice of Allowance for U.S. Appl. No. 14/200,195 dated Jul. 5, 2016.
U.S. Notice of Allowance for U.S. Appl. No. 14/200,530 dated Aug. 1, 2016.
U.S. Notice of Allowance for U.S. Appl. No. 14/203,655 dated Dec. 9, 2016.
U.S. Notice of Allowance in U.S. Appl. No. 13/795,276 dated Jan. 19, 2017.
U.S. Notice of Allowance in U.S. Appl. No. 13/803,958 dated Aug. 29, 2016.
U.S. Notice of Allowance in U.S. Appl. No. 13/803,958 dated Sep. 12, 2016.
U.S. Notice of Allowance in U.S. Appl. No. 14/610,770 dated May 5, 2017.
U.S. Notice of Allowance in U.S. Appl. No. 14/656,580 dated May 8, 2017.
U.S. Notice of Allowance in U.S. Appl. No. 14/819,273 dated Jun. 9, 2017.
U.S. Notice of Allowance in U.S. Appl. No. 15/099,464 dated Jun. 16, 2017.
U.S. Notice of Allowance in U.S. Appl. No. 13/480,569 dated Feb. 27, 2015.
U.S. Notice of Allowance in U.S. Appl. No. 14/610,770 dated Apr. 25, 2016.
U.S. Notice of Allowance in U.S. Appl. No. 14/610,770 dated Aug. 12, 2016.
U.S. Notice of Allowance in U.S. Appl. No. 14/610,770 dated Jan. 23, 2017.
U.S. Notice of Allowance in U.S. Appl. No. 14/819,273 dated Dec. 14, 2016.
U.S. Notice of Allowance in U.S. Appl. No. 14/819,273 dated Oct. 28, 2016.
U.S. Notice of Allowance in U.S. Appl. No. 14/856,198 dated Feb. 10, 2017.
U.S. Office Action for U.S. Appl. No. 13/548,539 dated Feb. 6, 2015.
U.S. Office Action for U.S. Appl. No. 13/795,276 dated Apr. 22, 2016.
U.S. Office Action for U.S. Appl. No. 13/795,276 dated Oct. 6, 2015.
U.S. Office Action for U.S. Appl. No. 13/802,896 dated Sep. 24, 2014.
U.S. Office Action for U.S. Appl. No. 13/803,958 dated Aug. 11, 2014.
U.S. Office Action for U.S. Appl. No. 13/803,958 dated May 28, 2015.
U.S. Office Action for U.S. Appl. No. 13/803,958 dated Nov. 18, 2015.
U.S. Office Action for U.S. Appl. No. 13/923,503 dated Mar. 22, 2016.
U.S. Office Action for U.S. Appl. No. 14/031,300 dated Jan. 20, 2016.
U.S. Office Action for U.S. Appl. No. 14/031,300 dated Jul. 7, 2015.
U.S. Office Action for U.S. Appl. No. 14/200,195 dated Mar. 21, 2016.
U.S. Office Action for U.S. Appl. No. 14/200,195 dated Nov. 4, 2015.
U.S. Office Action for U.S. Appl. No. 14/200,530 dated Feb. 29, 2016.
U.S. Office Action for U.S. Appl. No. 14/203,655 dated Aug. 10, 2016.
U.S. Office Action for U.S. Appl. No. 14/656,190 dated May 18, 2017.
U.S. Office Action for U.S. Appl. No. 14/656,657 dated Jul. 7, 2017.
U.S. Office Action for U.S. Appl. No. 14/686,452 dated Jun. 9, 2017.
U.S. Office Action for U.S. Appl. No. 14/843,944 dated Jun. 23, 2017.
U.S. Office Action for U.S. Appl. No. 14/856,471 dated May 31, 2017.
U.S. Office Action for U.S. Appl. No. 14/858,741 dated Dec. 1, 2016.
U.S. Office Action for U.S. Appl. No. 15/289,944 dated Feb. 9, 2017.
U.S. Office Action for U.S. Appl. No. 15/336,545 dated Dec. 19, 2016.
U.S. Office Action for U.S. Appl. No. 15/453,441 dated Jun. 5, 2017.
U.S. Office Action in U.S. Appl. No. 14/193,007 dated Apr. 24, 2017.
U.S. Office Action in U.S. Appl. No. 14/656,617 dated Apr. 4, 2017.
U.S. Office Action in U.S. Appl. No. 14/609,325 dated Feb. 16, 2017.
U.S. Office Action in U.S. Appl. No. 13/480,569 dated Jul. 30, 2014.
U.S. Office Action in U.S. Appl. No. 14/193,007 dated Dec. 21, 2015.
U.S. Office Action in U.S. Appl. No. 14/193,007 dated Jul. 1, 2016.
U.S. Office Action in U.S. Appl. No. 14/193,007 dated Oct. 21, 2016.
U.S. Office Action in U.S. Appl. No. 14/193,007 dated Mar. 23, 2017.
U.S. Office Action in U.S. Appl. No. 14/656,190 dated Aug. 29, 2016.
U.S. Office Action in U.S. Appl. No. 14/656,580 dated Jun. 2, 2016.
U.S. Office Action in U.S. Appl. No. 14/656,580 dated Feb. 9, 2017.
U.S. Office Action in U.S. Appl. No. 14/819,273 dated Jul. 6, 2016.
U.S. Office Action in U.S. Appl. No. 14/843,944 dated Jan. 6, 2017.
U.S. Office Action in U.S. Appl. No. 14/856,198 dated Jun. 3, 2016.
U.S. Office Action in U.S. Appl. No. 14/856,471 dated Dec. 1, 2016.
U.S. Office Action in U.S. Appl. No. 15/099,464 dated Mar. 10, 2017.
U.S. Office Action on U.S. Appl. No. 14/656,335 dated Apr. 25, 2017.
U.S. Restriction Requirement in U.S. Appl. No. 14/193,007 dated Jul. 17, 2015.
U.S. Supplemental Notice of Allowance for U.S. Appl. No. 13/795,276 dated Nov. 29, 2016.
Vallon, "Micropuncturing the nephron," Pflugers Archiv : European journal of physiology 458. 1 (May 2009): 189-201.
Van Der Zande et al, "Large-scale arrays of single-layer graphene resonators." Nano letters 10.12 (2010): 4869-4873.
Verdonck, P., "Plasma Etching", in Oficina de Microfabricao: Projeto e Construcao de CI's MOS, Swart, J.W., Ed., Campinas (Sao Paulo, Brazil): UNICAMP, 2006, ch. 10, p. 9.
Vlassiouk et al. "Large scale atmospheric pressure chemical vapor deposition of graphene." Carbon 54 (2013): 58-67.
Vlassiouk et al., "Versatile ultrathin nanoporous silicon nitride membranes," Proc. Natl. Acad. Sci. USA 106(50): 21039-21044 (Dec. 15, 2009).
Vriens et al. "Methodological considerations in quantification of oncological FDG PET studies." European journal of nuclear medicine and molecular imaging 37.7 (2010): 1408-1425.
Wadvalla, "Boosting agriculture through seawater," Nature Middle East, 1-4 (Jul. 2, 2012). Retrieved Jun. 1, 2016 from: natureasia.com/en/nmiddleeast/article/10.1038/nmiddleeast.2012.92?WT.mc_id=FBK NatureMEast].
Wang et al., "Direct Observation of a Long-Lived Single-Atom Catalyst Chiseling Atomic Structures in Graphene," Nano Lett., 2014, pp. A-F.

(56) References Cited

OTHER PUBLICATIONS

Wang et al., "Graphene Oxide Membranes with Tunable Permeability due to Embedded Carbon Dots." Chemical Communications 50(86): 13089-13092 (Nov. 2014; first published online Sep. 3, 2014).
Wang et al., "Porous Nanocarbons: Molecular Filtration and Electronics," Advances in Graphene Science, Edited by Mahmood Aliofkhazraei, (2013) ISBN 978-953-51-1182-5, Publisher: InTech; Chapter 6, pp. 119-160.
Wang et al.,"Wiat is the role of the second "structural" NADP+-binding site in human glucose 6-phosphate dehydrogenase?,"Protein science a publication of the Protein Society 17. 8 (Aug. 2008): 1403-11.
Wei et al., "Synthesis of N-doped graphene by chemical vapor deposition and its electrical properties", Nano Lett. 2009 9 1752-58.
Wikipedia, "Ion track." 1-12. Jun. 1, 2016. Retrieved Jun. 1, 2016 from: en.wikipedia.org/wiki/ion_track.
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 2454-2460.
Xie et al., "Fractionation and characterization of biologically-active polysaccharides from Artemisia tripartite," Phytochemistry 69. 6 (Apr 2008): 1359-71.
Xie, et al. "Controlled fabrication of high-quality carbon nanoscrolls from monolayer graphene." Nano letters 9.7 (2009): 2565-2570.
Xu et al., "Graphene Oxide-TiO2 Composite Filtration Membranes and their Potential Application for Water Purification." Carbon 62: 465-471 (Oct. 2013; first published online Jun. 21, 2013).
Xu et al., "Graphene-like Two-Dimensional Materials", Chemical Reviews 113: 3766-3798 (Jan. 3, 2013).
Yagil et al. "Nonproteinuric diabetes-associated nephropathy in the Cohen rat model of type 2 diabetes" Diabetes 54. 5 (May 2005): 1487-96.
Yoon, "Simulations show how to turn graphene's defects into assets," ScienceDaily (Oct. 4, 2016), www.sciencedaily.com/releases/2016/10/161004120428.htm.
Zabihi et al., "Formation of nanopore in a suspended graphene sheet with argon cluster bombardment: A molecular dynamics simulation study," Nuclear Instruments and Methods in Physics Research B, 343: 48-51: (available online Nov. 26, 2014).
Zan et al. "Interaction of Metals with Suspended Graphene Observed by Transmission Electron Microscopy", J. Phys. Chem. Lett., Mar. 8, 2012, 3, 953-958.
Zan et al., "Graphene Reknits Its Holes," Nano Lett. 12(8): 3936-3940 (Jul. 5, 2012).
Zhang et al. "Effect of Chemical Oxidation on the Structure of Single-Walled Carbon Nanotubes", J. Phys. Chem., Feb. 12, 2003, B 107 3712-8.
Zhang et al. "Method for anisotropic etching of graphite or graphene" Institute of Physics, Chinese Academy of Sciences; Peop. Rep. China; Mar. 30, 2011.
Zhang et al. "Production of Graphene Sheets by Direct Dispersion with Aromatic Healing Agents", Small, May 6, 2010, vol. 6, No. 10, 1100-1107.
Zhang et al. "Isolation and activity of an alpha-amylase inhibitor from white kidney beans," Yao xue xue bao=Acta pharmaceutica Sinica 42.12 (Dec. 2007): 1282-7.
Zhang et al., "Method for Anisotropic Etching of Graphite or Graphene," English Abstract Only, Institute of Physics, Chinese Academy of Sciences, Apr. 4, 2011, (2 pages).
Zhang et al., "Modern Thin-Film Technology" 284-285 (Metallurgical Industry Press, 1st ed. 2009) (English translation not readily available).
Zhao et al. "Two-Dimensional Material Membranes: An Emerging Platform for Controllable Mass Transport Applications," Small 10(22): 4521-4542 (Sep. 10, 2014).
Zhao et al, (2012), "Effect of SiO2 substrate on the irradiation-assisted manipulation of supported graphene: a molecular dynamics study," Nanotechnology 23(28): 285703 (Jul. 2012) (available online Jun. 25, 2012).
Zhao et al., "Drilling Nanopores in Graphene with Clusters: A Molecular Dynamics Study," J. Phys. Chem. C, 116(21): 11776-11782 (May 9, 2012).
Zhao et al., "A glucose-responsive controlled release of insulin system based on enzyme multilayers-coated mesoporous silica particles," Chem. Commun., 47: 9459-9461 (Jun. 15, 2011).
Zhao, et al. "Efficient preparation of large-area graphene oxide sheets for transparent conductive films." ACS nano 4.9 (2010): 5245-5252.
Zhou, K., et al., "One-pot preparation of graphene/ Fe3O4 composites by a solvothermal reaction," New J. Chem., 2010, 34, 2950.
Zhu et al. "Carbon Nanotubes in Biomedicine and Biosensing", Carbon Nanotubes—Growth and Applications, InTech, (Aug. 9, 2011) Chapter 6: pp. 135-162. Available from: https://www.intechopen.com/books/carbon-nanotubes-growth-and-applications/carbon-nanotubes-in-biomedicine-and-biosensing.
Ziegelmeier et al. "Adipokines influencing metabolic and cardiovascular disease are differentially regulated in maintenance hemodialysis," Metabolism: clinical and experimental 57. 10 (Oct. 2008): 1414-21.
Zirk et al. "A refractometry-based glucose analysis of body fluids," Medical engineering & physics 29. 4 (May 2007): 449-58.
Zyga "Nanoporous Graphene Could Outperform Best Commercial Water Desalination Techniques," Phys.org., Jun. 22, 2012, Retrieved from http://www.phys.org/pdf259579929.pdf [Last Accessed Dec. 3, 2014] (3 pages).
EPO Extended Search Report for European Application No. 171684883.5 dated Jul. 25, 2017 (8 pages).
EPO Supplementary Search Report for European Application No. 15762019.6 dated Aug. 9, 2017 (16 pages).
U.S. Office Action in U.S. Appl. No. 15/099,099 dated Oct. 5, 2017 (11 pages).
U.S. Office Action in U.S. Appl. No. 15/099,447 dated Oct. 3, 2017 (21 pages).
Weisen, et al., "Fabrication of nanopores in a graphene sheet with heavy ions: A molecular dynamics study", Journal of Applied Physics 114, 234304 (2013), pp. 234304-1 to 234304-6.

* cited by examiner

PERFORATED GRAPHENE DEIONIZATION OR DESALINATION

CROSS REFERENCE TO RELATED APPLICATION

The present application is a continuation of U.S. patent application Ser. No. 13/719,579, filed Dec. 19, 2012, now U.S. Pat. No. 9,475,709, issued on Oct. 25, 2016; which is a continuation-in-part application of application Ser. No. 12/868,150 filed Aug. 25, 2010, now U.S. Pat. No. 8,361,321, issued on Jan. 29, 2013, each of which is incorporated herein by reference.

BACKGROUND ART

As fresh water resources are becoming increasingly scarce, many nations are seeking solutions that can convert water that is contaminated with salt, most notably seawater, into clean drinking water.

Existing techniques for water desalination fall into four broad categories, namely distillation, ionic processes, membrane processes, and crystallization. The most efficient and most utilized of these techniques are multistage flash distillation (MSF), multiple effect evaporation (MEE) and reverse osmosis (RO). Cost is a driving factor for all of these processes, where energy and capital costs are both significant. Both RO and MSF/MEE technologies are thoroughly developed. Currently, the best desalination solutions require between two and four times the theoretical minimum energy limit established by simple evaporation of water, which is in the range of 3 to 7 kjoules/kg. Distillation desalination methods include multistage flash evaporation, multiple effect distillation, vapor compression, solar humidification, and geothermal desalination. These methods share a common approach, which is the changing of the state of water to perform desalination. These approaches use heat-transfer and/or vacuum pressure to vaporize saline water solutions. The water vapor is then condensed and collected as fresh water.

Ionic process desalination methods focus on chemical and electrical interactions with the ions within the solution. Examples of ionic process desalination methods include ion exchange, electro-dialysis, and capacitive deionization. Ion exchange introduces solid polymeric or mineral ion exchangers into the saline solution. The ion exchangers bind to the desired ions in solution so that they can be easily filtered out. Electro-dialysis is the process of using cation and anion selective membranes and voltage potential to create alternating channels of fresh water and brine solution. Capacitive deionization is the use of voltage potential to pull charged ions from solution, trapping the ions while allowing water molecules to pass.

Membrane desalination processes remove ions from solution using filtration and pressure. Reverse osmosis (RO) is a widely used desalination technology that applies pressure to a saline solution to overcome the osmotic pressure of the ion solution. The pressure pushes water molecules through a porous membrane into a fresh water compartment while ions are trapped, creating high concentration brine solution. Pressure is the driving cost factor for these approaches, as it is needed to overcome osmotic pressure to capture the fresh water.

Crystallization desalination is based on the phenomenon that crystals form preferentially without included ions. By creating crystallized water, either as ice or as a methyl hydrate, pure water can be isolated from dissolved ions. In the case of simple freezing, water is cooled below its freezing point, thereby creating ice. The ice is then melted to form pure water. The methyl hydrate crystallization processed uses methane gas percolated through a saltwater solution to form methane hydrate, which occurs at a lower temperature than at which water freezes. The methyl hydrate rises, facilitating separation, and is then warmed for decomposition into methane and desalinated water. The desalinated water is collected, and methane is recycled.

Evaporation and condensation for desalination is generally considered to be energy efficient, but requires a source of concentrated heat. When performed in large scale, evaporation and condensation for desalination are generally co-located with power plants, and tend to be restricted in geographic distribution and size.

Capacitive deionization is not widely used, possibly because the capacitive electrodes tend to foul with removed salts and to require frequent service. The requisite voltage tends to depend upon the spacing of the plates and the rate of flow, and the voltage can be a hazard.

Reverse osmosis (RO) filters are widely used for water purification. The RO filter uses a porous or semipermeable membrane typically made from cellulose acetate or polyimide thin-film composite, typically with a thickness in excess of 200 microns. These materials are hydrophilic. The membrane is often spiral-wound into a tube-like form for convenient handling and membrane support. The membrane exhibits a random-size aperture distribution, in which the maximum-size aperture is small enough to allow passage of water molecules and to disallow or block the passage of ions such as salts dissolved in the water. Notwithstanding the one-millimeter thickness of a typical RO membrane, the inherent random structure of the RO membrane defines long and circuitous or tortuous paths for the water that flows through the membrane, and these paths may be much more than one millimeter in length. The length and random configuration of the paths require substantial pressure to strip the water molecules at the surface from the ions and then to move the water molecules through the membrane against the osmotic pressure. Thus, the RO filter tends to be energy inefficient.

FIG. 1 is a notional illustration of a cross-section of an RO membrane 10. In FIG. 1, membrane 10 defines an upstream surface 12 facing an upstream ionic aqueous solution 16 and a downstream surface 14. The ions that are illustrated on the upstream side are selected as being sodium (Na) with a + charge and chlorine (CI) with a − charge. The sodium is illustrated as being associated with four solvating water molecules ($H_2O$). Each water molecule includes an oxygen atom and two hydrogen (H) atoms. One of the pathways 20 for the flow of water in RO membrane 10 of FIG. 1 is illustrated as extending from an aperture 20u on the upstream surface 12 to an aperture 20d on the downstream surface 14. Path 20 is illustrated as being convoluted, but it is not possible to show the actual tortuous nature of the typical path. Also, the path illustrated as 20 can be expected to be interconnected with multiple upstream apertures and multiple downstream apertures. The path(s) 20 through the RO membrane 10 are not only convoluted, but they may change with time as some of the apertures are blocked by unavoidable debris.

Alternative water desalination, deionization, or fluid separation is desired.

SUMMARY OF THE INVENTION

In light of the foregoing, it is a first aspect of the present invention to provide perforated graphene deionization or desalination.

It is another aspect of the present invention to provide a method for deionizing fluid carrying unwanted ions, the method comprising providing at least one sheet of graphene with plural perforated apertures selected to allow the passage of fluid and to disallow the passage of a at least one of the unwanted ions, forming the at least one sheet of graphene into a cylindrical form, inserting the cylindrical form into a housing, pressurizing the fluid carrying unwanted ions to thereby generate pressurized fluid to flow through the housing, applying the pressurized fluid to a first surface of the at least one perforated graphene in the cylindrical form, so that fluid flows to a second side of the at least one perforated graphene sheet in cylindrical form in preference to ions, and collecting the fluid from the second side of the at least one graphene sheet.

Still another aspect of the present invention is to provide a fluid deionizer, comprising a cylindrical form of at least one graphene sheet perforated with apertures dimensioned to allow the flow of fluid and to disallow the flow of ions of at least one particular type, a source of fluid laden with ions of the particular type, and a path for the flow of the fluid laden with ions of the at least one particular type through the cylindrical form of at least one graphene sheet perforated with apertures.

Yet another aspect of the present invention is to provide a fluid deionizer comprising at least one graphene sheet perforated with apertures dimensioned to allow a flow of fluid and to disallow at least one particular type of ion contained in the flow of fluid, a support chamber carrying the at least one graphene sheet, the support chamber having an upstream portion that receives the at least one graphene sheet, a source of fluid laden with the at least one particular type of ion, a path for the flow of the fluid laden with the at least one particular type of ion through the at least one graphene sheet perforated with apertures, and a purge valve associated with the upstream portion, the purge valve placed in an open position so as to collect the at least one particular type of ion disallowed by the at least one graphene sheet.

Still another aspect of the present invention is to provide a method for separating components from a medium, comprising providing a primary sheet of at least one layer of graphene with plural perforated apertures selected to allow the passage of a medium and to disallow the passage of selected components in the medium, providing the primary sheet of at least one layer of graphene in a primary chamber, the primary chamber having a primary inlet, a primary outlet, and a primary lower flow path, and pressurizing the medium to flow in a path substantially parallel to the primary sheet of at least one layer of graphene from the primary inlet to the primary outlet, the medium flowing on to a first surface of the primary sheet of at least one layer of graphene so that a portion of the medium flows to a second side of the primary sheet of at least one layer of graphene through the plural perforated apertures while a remaining portion of the medium and the disallowed selected components in the medium flow out the primary outlet.

Yet another aspect of the present invention is to provide a separation apparatus, comprising at least one chamber having an inlet, an outlet and a lower flow path, at least one sheet of graphene perforated with apertures dimensioned to allow passage of a medium and to disallow passage of selected components in the medium, the at least one sheet of graphene positioned in the at least one chamber, and a pressurized source of the medium connected to the at least one chamber having the inlet, the pressurized source directing the medium along a path substantially parallel to the at least one sheet of graphene from the inlet to the outlet, the medium flowing on to a first surface of the at least one sheet of graphene so that a portion of the medium flows to a second side of the at least one graphene sheet through the plural perforated apertures while a remaining portion of the medium and the disallowed selected components in the medium flow out the outlet.

BEST MODE FOR CARRYING OUT THE INVENTION

Figure 1:
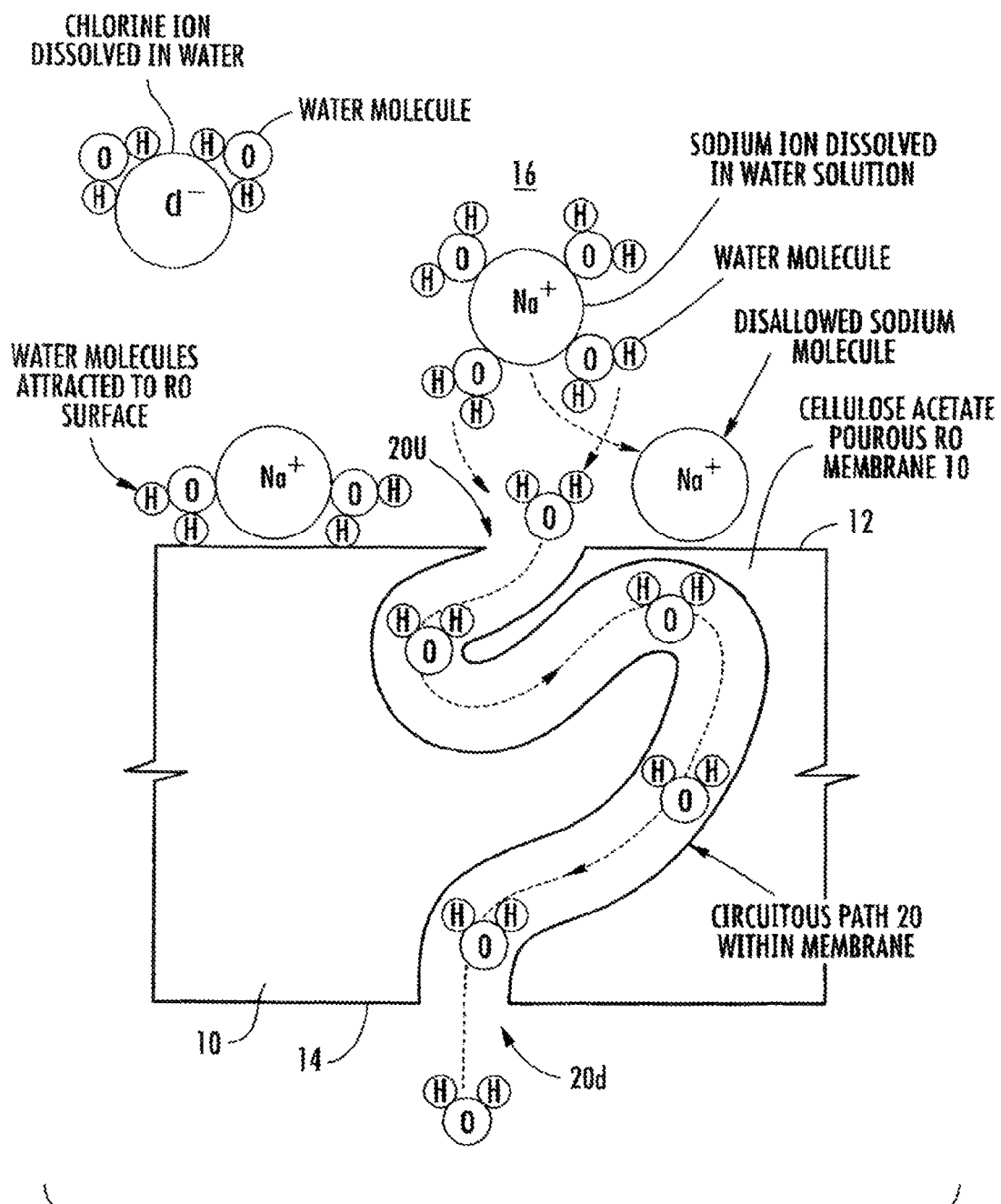
FIG. 1 is a notional cross-sectional representation of a prior-art reverse osmosis (RO) filter membrane.
Figure 2:
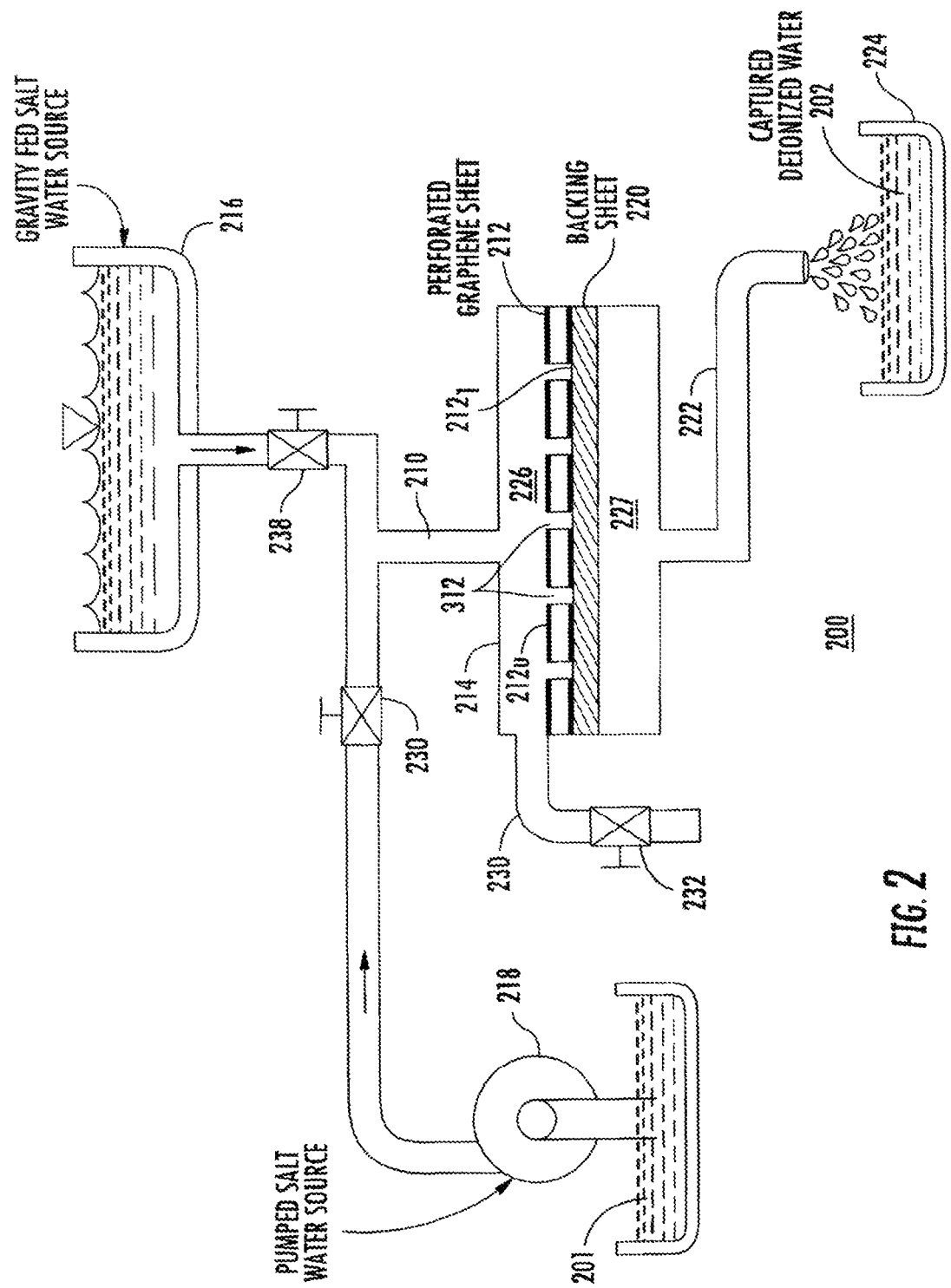
FIG. 2 is a notional representation of a water filter according to an aspect of the disclosure, using a perforated graphene sheet.
Figure 3:
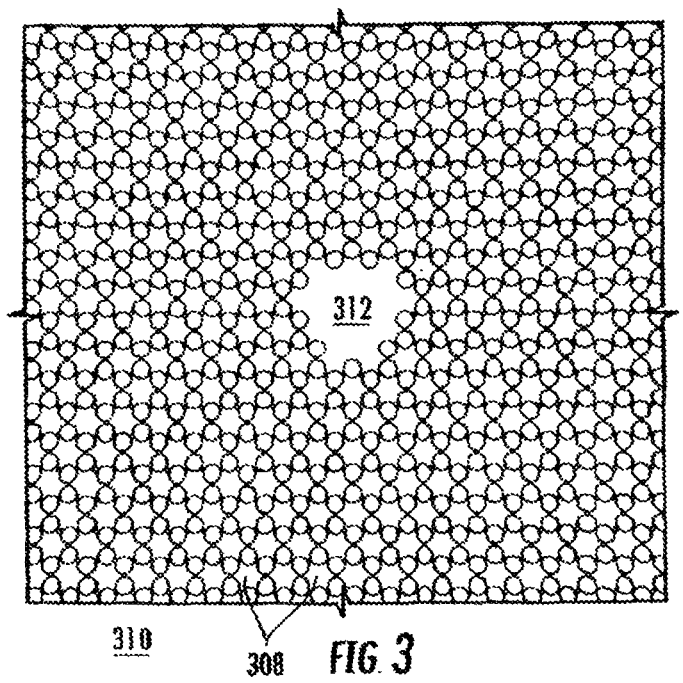
FIG. 3 is a plan representation of a perforated graphene sheet which may be used in the arrangement of FIG. 2, showing the shape of one of the plural apertures.

FIG. 2 is a notional representation of a basic desalination, desalinization or deionization apparatus 200 according to an exemplary embodiment or aspect of the disclosure. In FIG. 2, a channel 210 conveys ion-laden water to a filter membrane 212 mounted in a supporting chamber 214. The ion-laden water may be, for example, seawater or brackish water. In one exemplary embodiment, the filter membrane 212 can be wound into a spiral in known manner. Flow impetus or pressure of the ion-laden water flowing through channel 210 of FIG. 2 can be provided either by gravity from a tank 216 or from a pump 218. Valves 236 and 238 allow selection of the source of ion-laden water. In apparatus or arrangement 200, filter membrane 212 is a perforated graphene sheet. Graphene is a single-atomic-layer-thick layer of carbon atoms, bound together to define a sheet 310, as illustrated in FIG. 3. The thickness of a single graphene sheet is approximately 0.2 to 0.3 nanometers (nm). Multiple graphene sheets can be formed, having greater thickness and correspondingly greater strength. Multiple graphene sheets can be provided in multiple layers as the sheet is grown or formed. Or multiple graphene sheets can be achieved by layering or positioning one sheet on top or another. For all the embodiments disclosed herein, a single sheet of graphene or multiple graphene sheets may be used. Testing reveals that multiple layers of graphene maintain their integrity and function as a result of self-adhesion. This improves the strength of the sheet and in some cases flow performance. The carbon atoms of the graphene sheet 310 of FIG. 3 define a repeating pattern of hexagonal ring structures (benzene rings) constructed of six carbon atoms, which form a honeycomb lattice of carbon atoms. An interstitial aperture 308 is formed by each six carbon atom ring structure in the sheet and this interstitial aperture is less than one nanometer across. Indeed, skilled artisans will appreciate that the interstitial aperture 308 is believed to be about 0.23 nanometers across its longest dimension. Accordingly, the dimension and configuration of the aperture 308 and the electron nature of the graphene precludes transport of any molecule across the graphene's thickness unless there are perforations. This dimension is much too small to allow the passage of either water or ions. In order to form the perforated graphene sheet 212 of FIG. 2, one or more perforations are made, as illustrated in FIG. 3. A representative generally or nominally round aperture 312 is defined through the graphene sheet 310. Aperture 312 has a nominal diameter of about 0.6 nanometers. The 0.6 nanometer dimension is selected to block the smallest of the ions which would ordinarily be expected in salt or brackish water, which is the sodium ion. The generally round shape of the aperture 312 is affected by the fact that the edges of the aperture are defined, in part, by the hexagonal carbon ring structure of the graphene sheet 310.

Aperture 312 may be made by selective oxidation, by which is meant exposure to an oxidizing agent for a selected period of time. It is believed that the aperture 312 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures comprising a single sheet or multiple sheets. The structures may be graphene nanoplatelets and graphene nanoribbons. Thus, apertures in the desired range can be formed by shorter oxidation times. Another more involved method as described in Kim et al. "*Fabrication and Characterization of Large Area, Semiconducting Nanoperforated Graphene Materials*," Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce a perforated graphene sheet or sheets.

As mentioned, the graphene sheet 310 of FIG. 3 has a thickness of but a single atom. Thus, the sheet tends to be flexible. The flex of the graphene sheet can be ameliorated by applying a backing structure to the sheet 212 or by providing more than one graphene sheet. In FIG. 2, a backing structure, which may also be referred to as a backing sheet, of perforated graphene sheet 212 is illustrated as 220. Backing structure 220 in this embodiment is a sheet of perforated polytetrafluoroethylene, sometimes known as polytetrafluoroethane. The structure 220 may also be perforated polycarbonate film, nanostructured carbon, other suitable polymeric materials, or sintered porous metal. A thickness of the backing sheet may be, for example, from one hundred microns to one millimeter (mm).

It should be noted that, in the apparatus or arrangement of FIG. 2, the pressure of ion-laden water applied through path 210 to the perforated membrane 212 can be provided by gravity from tank 216, thereby emphasizing one of the aspects of the apparatus 200. That is, unlike the RO membrane, the perforated graphene sheet 312 forming the perforated membrane 212 is hydrophobic, and the water passing through the pierced apertures (312 of FIG. 3) is not impeded by the attractive forces attributable to wetting. Also, as mentioned, the length of the flow path through the apertures 312 in graphene sheet 310 is equal to the thickness of the sheet, which is about 0.2 to 0.3 nm. This length is much less than the lengths of the random paths extending through a RO membrane. Consequently, very little pressure is required to provide fluid flow, or conversely, the flow at a given pressure is much greater in the perforated graphene sheet 310. This, in turn, translates to a low energy requirement for ion separation. It is known to those skilled in the art that the pressure required in a RO membrane to force water through the membrane against osmotic pressure includes a frictional component which results in heating of the membrane. Consequently, some of the pressure which must be applied to the RO membrane does not go toward overcoming osmotic pressure, but instead goes into heat. Simulated results show that the perforated graphene sheet reduces the required pressure significantly. Additionally, energy savings resulting from reduced pretreatment and reduced fouling over time resulting from graphene's chemical and biological neutrality will also result in significant savings. As mentioned, the perforations 312 in graphene sheet 212 of FIG. 2 (or equivalently graphene sheet 310 of FIG. 3) or multiple graphene sheets in either embodiment are dimensioned to disallow the passage of the smallest ions to be expected in the source water. Consequently, any ions equal to or larger in size than the smallest will not pass through the perforated graphene sheet 212, and such ions can be expected to accumulate in an upstream side 226 of the graphene-sheet-supporting chamber 214. This accumulation of ions in upstream "chamber" 226 is referred to herein as "sludge," and will eventually reduce the flow of water through the perforated graphene sheet 212, thereby tending to render it ineffective for deionization. As illustrated in FIG. 2, a further path 230 is provided, together with a discharge valve 232, to allow purging or discharge of the sludge. Thus, operation of the apparatus or arrangement 200 of FIG. 2 may be in a "batch" mode. The first mode of the batch operation occurs with flow of ion-laden water through path 210, with discharge valve 232 closed to prevent flow. The ion-laden water fills the upstream side 226 of the support chamber 214. The water molecules are allowed to flow through perforated graphene sheet 212 of FIG. 2 and through the backing sheet 220 to the downstream side 227 of the support chamber 214. Thus, deionized water accumulates in downstream portion 227 for a period of time, and is available to be drawn off through a path 222 to a capture vessel illustrated as a tank 224. Eventually, the accumulation or concentration of ions in upstream portion 226 of the support chamber will tend to reduce the flow of water through the perforated graphene sheet 212. In order to purge the concentrated ion/water mix accumulated on or in the upstream chamber or side 226, valve 232 is opened, which allows the concentrated ion/water mix to be purged while the upstream portion 226 refills with ion-laden water from tank 216 or pump 218. Valve 232 is then closed and another filtration cycle begins. This results in the production of deionized water and accumulation of the deionized water in container 224.

Figure 4:
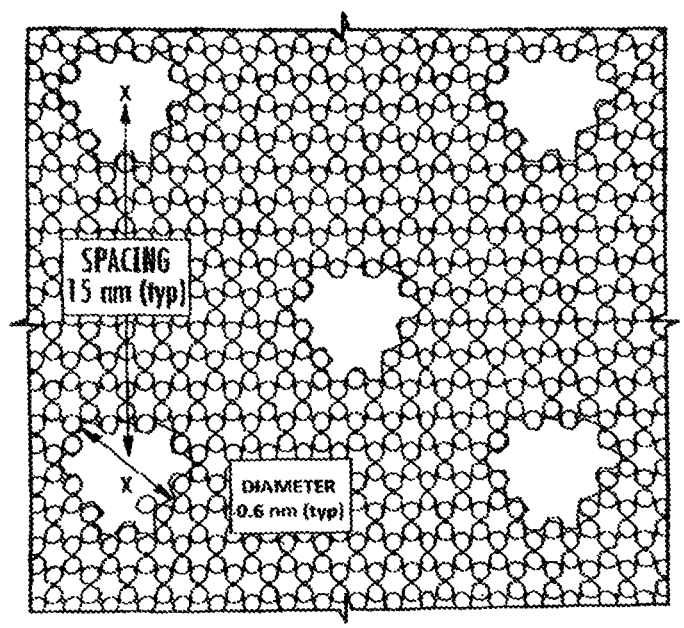
FIG. 4 is a plan view of a perforated graphene sheet, showing 0.6 nanometer diameter perforations or apertures and interperforation dimensions.

FIG. 4 is a representation of a graphene sheet with a plurality of perforations such as that of FIG. 3. The sheet of FIG. 4 defines [three, four, or five] apertures. In principle, the flow rate will be proportional to the aperture density. As the aperture density increases, the flow through the apertures may become "turbulent," which may adversely affect the flow at a given pressure. Also, as the aperture density increases, the strength of the underlying graphene sheet may be locally reduced. Such a reduction in strength may, under some circumstances, result in rupture of the membrane. The center-to-center spacing between apertures is believed to be near optimum for the 0.6 nanometer apertures at a value of fifteen nanometers.

Figure 5:
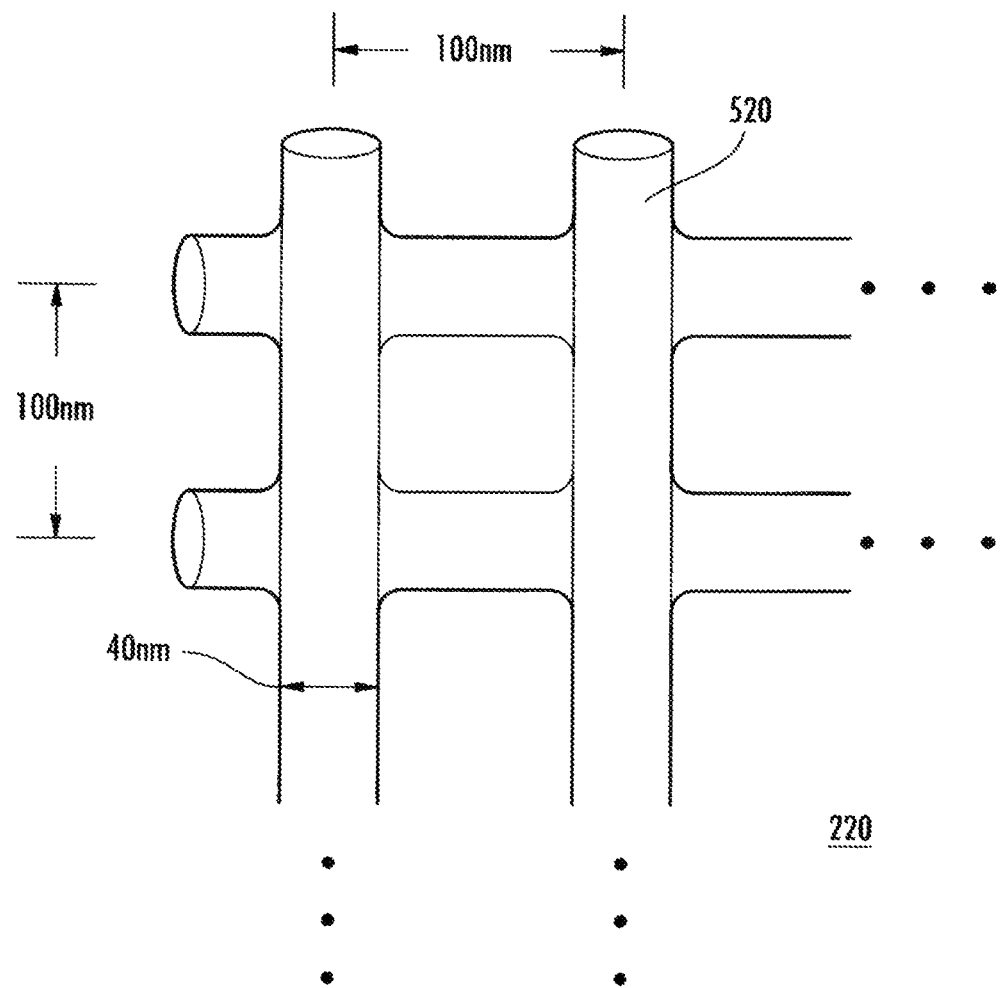
FIG. 5 is a plan representation of a backing sheet that may be used in conjunction with the perforated graphene sheet of FIG. 2.

FIG. 5 is a simplified illustration of the structure of a backing sheet which may be used with the graphene sheet of FIG. 2 or if multiple graphene sheets are used. In FIG. 5, backing sheet 220 is made from filaments 520 of polytetrafluoroethylene, also known as polytetrafluoroethane, arranged in a rectangular grid and bonded or fused at their intersections. The backing sheet 220 may also be perforated polycarbonate film, nanostructured carbon, other suitable polymeric materials, or sintered porous metal. As with the perforated graphene sheet, the dimensions in the backing sheet should be as large as possible for maximum flow, commensurate with sufficient strength. The spacing between mutually adjacent filaments 520 oriented in the same direction can be nominally 100 nm, and the filaments may have a nominal diameter of 40 nm. The tensile strength of the graphene sheet is great, and so the relatively large unsupported areas in the backing sheet should not present problems.

Figure 6:
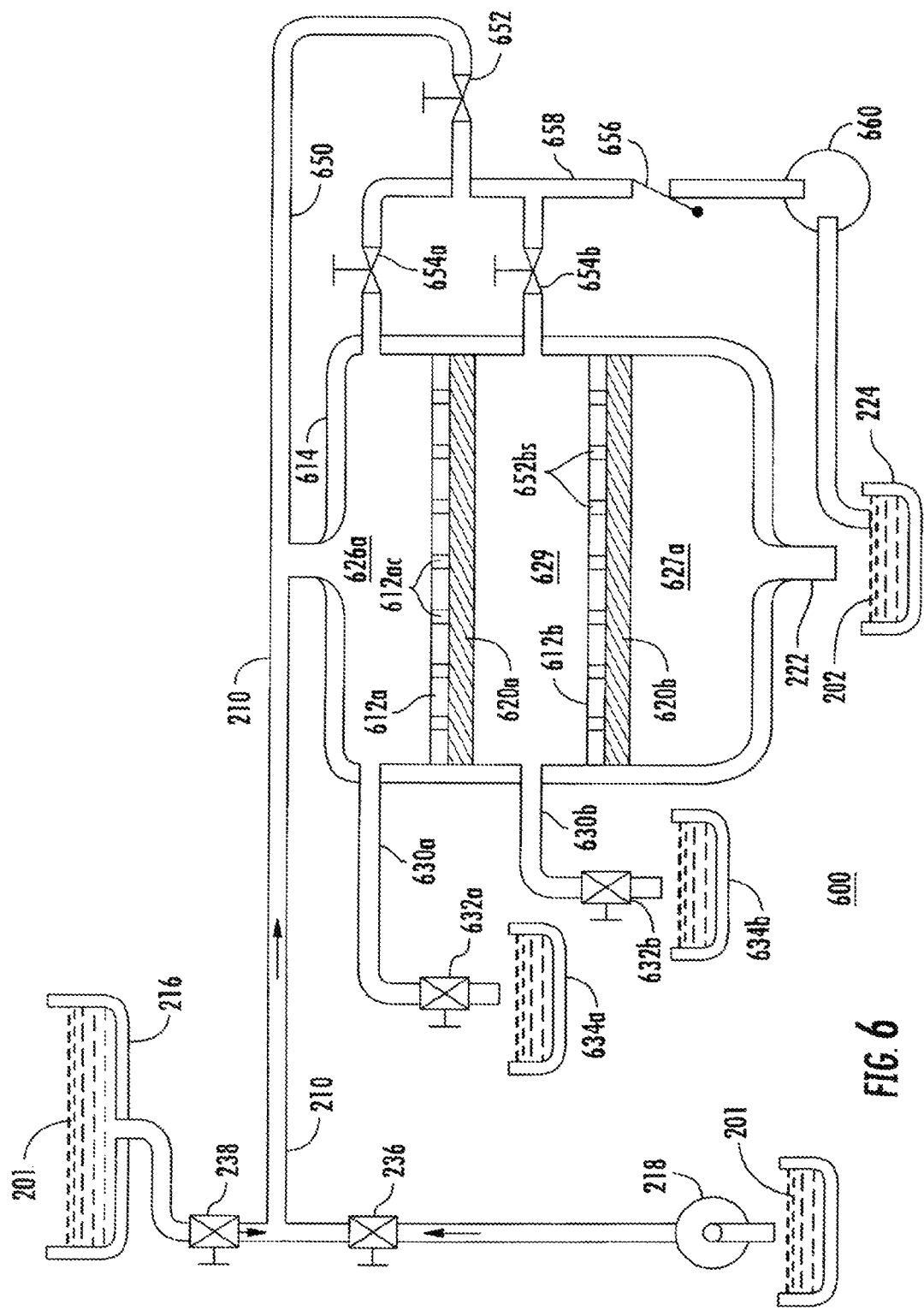
FIG. 6 is a notional representation of a water deionization filter according to aspects of the disclosure, using multiple perforated graphene sheets for separation of the concentrated ions.

FIG. 6 is a notional illustration of a deionization or desalination apparatus 600 according to another embodiment or aspect of the disclosure, in which multiple layers of differently-perforated graphene sheets are used. In FIG. 6, elements corresponding to those of FIG. 2 are designated by like reference alphanumerics. It will be appreciated that each "layer" in FIG. 6 may be a single sheet of graphene or multiple sheets of graphene. Within support chamber 614 of FIG. 6, upstream and downstream perforated graphene sheets 612a and 612b, respectively, divide the chamber into three volumes or portions, namely an upstream portion or chamber 626a, a downstream portion or chamber 626b, and an intermediate portion or chamber 629. Each perforated graphene sheet 612a and 612b is associated with a backing sheet. More particularly, perforated graphene sheet 612a is backed by a sheet 620a, and perforated graphene sheet 612b is backed by a sheet 620b. The perforations of the perforated graphene sheets 612a and 612b differ from one another. More particularly, upstream graphene sheet 612a is perforated by apertures 612ac selected to disallow or disable the flow of chlorine ions and to enable the flow of water laden with sodium ions; these apertures are 0.9 nanometers in nominal diameter. Thus, chlorine ions, having a greater effective diameter than 0.9 nanometers, cannot pass through perforated graphene sheet 612a, but remain in the upstream portion or chamber 626a. Water laden with sodium ions can flow through perforated graphene sheet 612a into intermediate chamber 629. Downstream perforated graphene sheet 612b is perforated with apertures 652bs selected to disallow or disable the flow of sodium ions and to enable the flow of water molecules; these apertures are 0.6 nanometers in nominal diameter. Thus, chlorine ions, having a greater effective diameter than 0.9 nanometers, cannot pass through apertures 612ac of perforated graphene sheet 612a, but water laden with sodium ions can flow through the apertures 612ac of perforated graphene sheet 612a into intermediate chamber 629. Sodium ions cannot pass through downstream perforated graphene sheet 612b, and so remain or accumulate in intermediate portion or chamber 629. The water molecules (H2O), free of at least chlorine and sodium ions, can flow from intermediate portion or chamber 629 through apertures 652bs of perforated graphene sheet 612b and into downstream portion or chamber 626b, from whence the deionized water can be collected through path 222 and collection vessel 224.

As with the case of the deionization arrangement 200 of FIG. 2, the apparatus or arrangement 600 of FIG. 6 accumulates or concentrates ions during deionization operation. Unlike the apparatus or arrangement of FIG. 2, however, deionizer 600 produces at least partially separated concentrations of ions. More particularly, with a flow of water laden with chlorine and sodium ions, upstream portion or chamber 626a of apparatus 600 accumulates a sludge concentration consisting principally of chlorine ions, and intermediate portion or chamber 629 accumulates a concentration principally of sodium ions. These concentrated ions can be separately extracted by selective control of purging connections 630a and 630b and their purge valves 632a and 632b, respectively. More particularly, valve 632a can be opened to allow the concentrated chlorine ions to flow from upstream portion or chamber 626a to a collecting vessel illustrated as a tank 634a, and valve 632b can be opened to allow the concentrated sodium ions to flow from intermediate portion or chamber 629 to a collecting vessel illustrated as a tank 634b. Ideally, purge valve 632a is closed before purging of intermediate portion or tank 629 is begun, so that some pressure is maintained across perforated graphene sheet 612a to provide a flow of water through perforated graphene sheet 612a to aid in flushing the sodium-ion-rich sludge from the intermediate chamber 629. Purge valves 632a and 632b are closed prior to proceeding with the deionization. The purged and collected concentrated ions have economic value, as for conversion into solid form in the case of sodium or gaseous form in the case of chlorine. It should be noted that sea water contains significant amounts of beryllium salts, and these salts, if preferentially concentrated, have value to the pharmaceutical industry as a catalyst.

Also illustrated in FIG. 6 are cross-flow valves 654a and 654b, communicating between a flow path 658 and upstream portion or chamber 626a and intermediate portion or chamber 626b, respectively. Unfiltered water 201 loaded with ions can be routed to flow path 658 by opening valve 652, or deionized water 202 can be provided from tank 224 by operating a pump 660. From pump 660, the deionized water flows through a check valve 656 to path 658. Cross-flow valves 654a and 654b are opened and closed simultaneously with purge valves 632a and 632b, respectively, to thereby aid in purging the sludge from the chambers.

Figure 7:
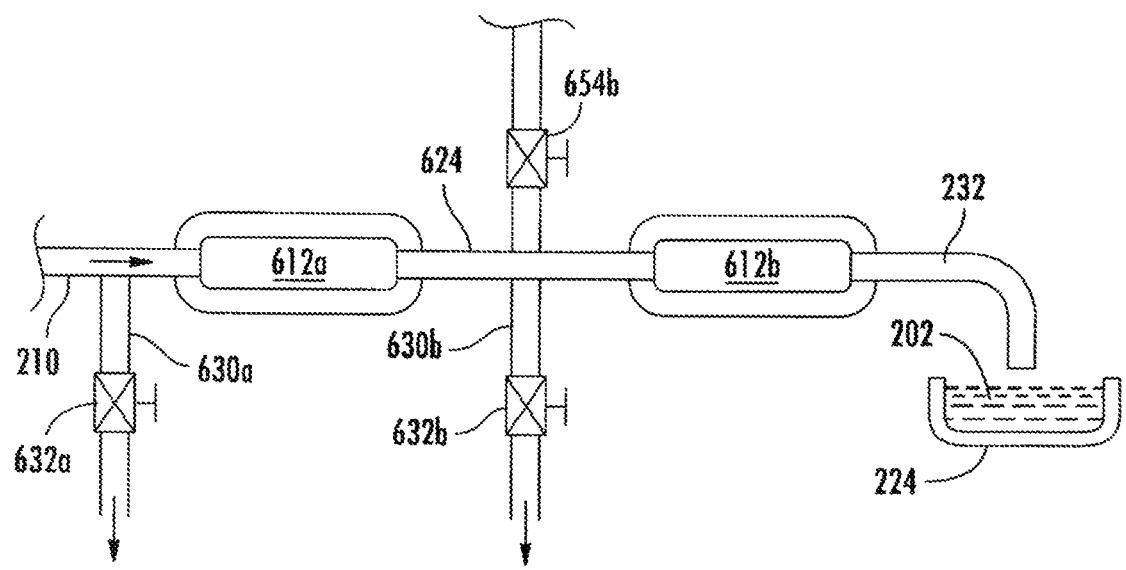
FIG. 7 is a simplified diagram illustrating a plumbing arrangement corresponding generally to the arrangement of FIG. 6, in which the perforated graphene sheets are spirally wound and enclosed in cylinders.

FIG. 7 is a simplified representation of a deionizing or ion separating arrangement according to an aspect of the disclosure. Elements of FIG. 7 corresponding to those of FIG. 6 are designated by like reference alphanumerics. In FIG. 7, the perforated graphene sheets 612a and 612b are rolled or spiral-wound into cylindrical form, and inserted into housings illustrated as 712a and 712b, respectively, as know from the RO membrane arts. As in the other embodiments, the graphene sheets 612a and 612b may be a single sheet of graphene or multiple sheets of graphene. And, as in the previous embodiments, multiple sheets improve their collective strength and flow performance.

Those skilled in the art will understand that ions other than chlorine and sodium may be removed from water by selectively perforated graphene sheets.

Figure 8:
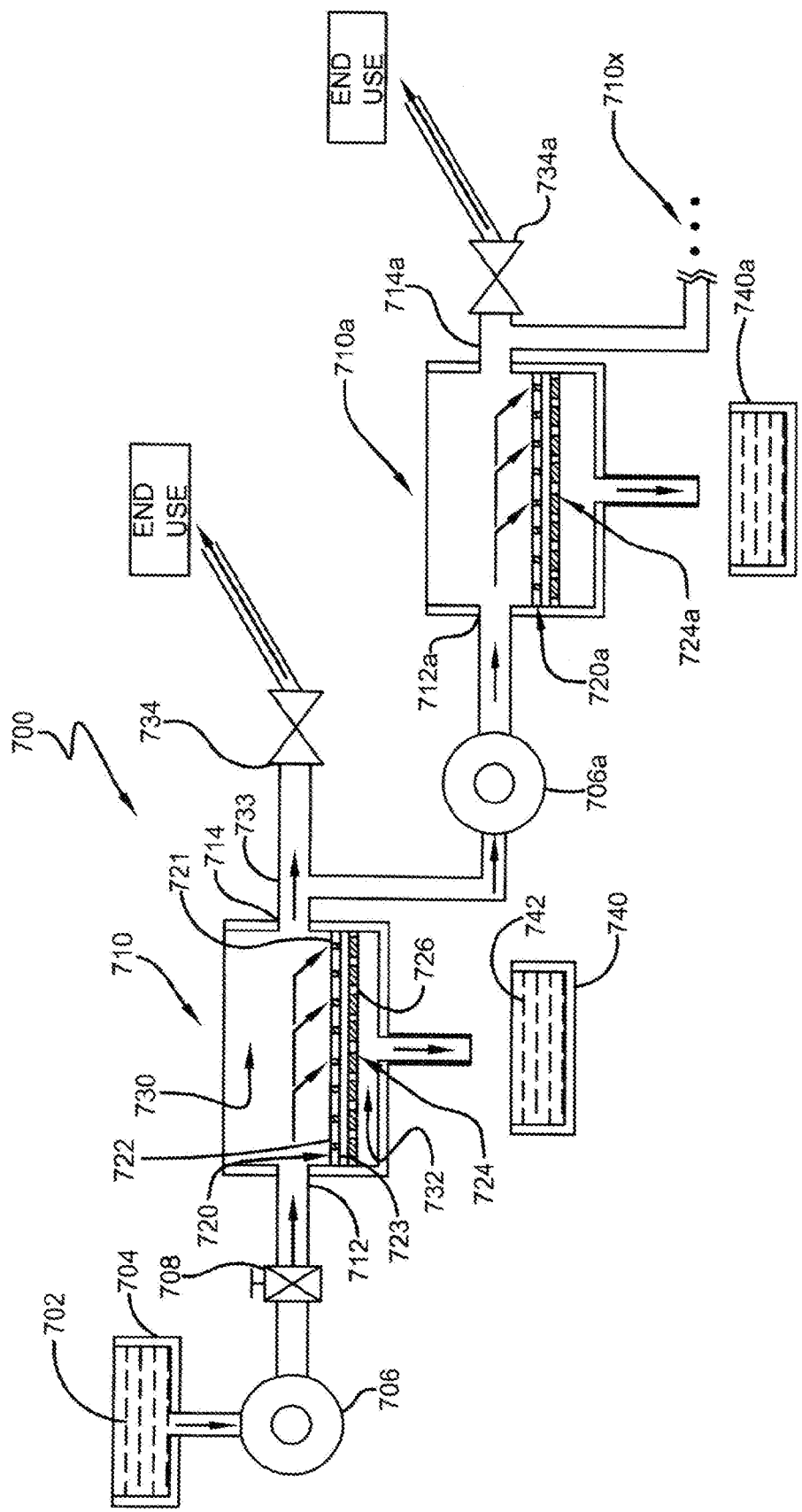
FIG. 8 is a notional representation of a separation apparatus according to aspects of the disclosure.

FIG. 8 is a simplified representation of a cross-flow separation apparatus according to an aspect of the disclosure. The separation apparatus, designated generally by the numeral 700, is configured to deionize, desalinate or otherwise separate a selected component from another, such as gasses, particulates, solutes, molecules, and hydrocarbons or any other nano-sized or micro-sized constituent from a medium. In the present embodiment, an unfiltered or pre-filtered medium 702 is provided in a container 704 of appropriate size. The medium may constitute a fluid or a gas or combination thereof which contains components that are to be separated from one another. The unfiltered medium 702 is delivered by gravity or otherwise to a high-pressure pump 706 which propels the medium along a conduit or pipe that may or may not have a valve 708. If the valve 708 is provided and is in an open condition, the unfiltered medium enters a cross-flow chamber designated generally by the numeral 710. The chamber is provided with a cross-flow inlet 712 at one end and a cross-flow outlet 714 at an opposite end. Positioned in the chamber 710 at a position relatively lower than the inlet and outlet is a graphene membrane 720.

As in the previous embodiments, the graphene membrane 720, either a single sheet or multiple sheets, has a plurality of perforated apertures 721 which are sized as appropriate to allow selected portions of the medium to pass through while disallowing other portions of the medium from passing through. Generally, perforation aperture diameters for gas separation range from 0.2 to 0.6 nm, for salts from 0.6 to 2 nm, and hydrocarbon molecules from 10 to 100 nm. As in the previous embodiments, the membrane 720 is a single-atomic-layer-thick layer of carbon atoms bound together to define a sheet. The thickness of a single graphene sheet is approximately 0.2 to 0.3 nanometers (nm). The membrane has a first or top surface 722 that is exposed to the pressurized flow of the medium and a second or underlying surface 723 that is opposite the surface 722. All of the characteristics and attributes of the graphene sheets described in the previous embodiments are provided in the present embodiment.

However, in the present embodiment the apertures may range in size from an effective diameter of 0.6 nanometers to an effective diameter of 1.2 nanometers as appropriate for filtering or separating the medium provided. In other words, some of the apertures may have a diameter of 0.6 nanometers, some 0.9 nanometers, and still others 1.2 nanometers. Any combination and proportion of different sized apertures may be used. In the case of desalinating or deionizing water this range of apertures is believed sufficient to disallow a majority of sodium ions and chlorine ions from passing through the graphene membrane while allowing water molecules to pass through. In other embodiments, for the cross-flow geometry apparatus, perforation diameters for gas separation range from 0.2 to 0.6 nm, for separation of salts from 0.6 to 2 nm, and for separation of hydrocarbon molecules from 10 to 100 nm. Other selected ranges between 0.2 nm and 100 nm may be used depending upon the configuration of the medium and the constituents to be disallowed. Moreover, specific ranges of diameters within the 0.2 nm to 100 nm range may be used.

In some embodiments a backing sheet or structure such as a supporting membrane 724 may be disposed underneath the graphene membrane 722 for support of the membrane. In other words, the supporting membrane 724 is positioned adjacent the surface 723 of the membrane 720. The backing membrane is perforated with apertures 726 which are substantially larger than the apertures 721. The supporting membrane 724 may be constructed of polytetrafluoroethylene, which is sometimes referred to as polytetrafluoroethane. Other materials for the membrane 724 may be perforated polycarbonate film, nanostructured carbon, other suitable polymeric materials, or sintered porous metal.

With the graphene membrane 720 inserted and positioned into the chamber 710, an upper flow path 730 is formed. The upper flow path allows for the pressurized fluid to flow in a direction substantially parallel with the membrane from the inlet 712 toward the outlet 714. As a result, the medium flows tangentially across the membrane and the portions of the medium that are sized to proceed through the various apertures 721 and, if provided, through the supporting membrane 724, into a lower flow path 732 that is beneath the graphene membrane. Those constituents that do not flow through the apertures are directed through the outlet 714 along a conduit 733 which may be provided with a valve 734. From the valve, the unfiltered medium (disallowed components) is then directed to a particular end use. For example, if water is the medium, the collected sodium and chlorine ions are collected for energy recovery use, such as in a galvanic battery or any other application. The purified medium collected in the lower flow path is then directed to a collection vessel 740 which holds the purified material or medium 742.

From the foregoing description it will be appreciated that the pressurized flow of the medium in a direction substantially parallel with the membrane, or in other words tangentially directed, allows for the medium to flow through the apertures while also allowing for the collected disallowed material to be moved along toward the outlet. Such a "cleaning" of the membrane prevents caking or other undesired collection of the disallowed material on the membrane. This is believed to assist the flow-through of the allowed or purified material 742 to be collected in the vessel 740.

In some embodiments the apparatus 700 may include any number of downstream cross-flow chambers 710, wherein each chamber and related components are provided with an alphabetic suffix. Accordingly, the disallowed fluid material flowing through the chamber outlet 714 is directed to a secondary high pressure pump 706a which directs the fluid into a chamber 710a that is constructed in substantially the same manner as the chamber 710. As a result, the previously disallowed components and medium are further purified so as to collect in a vessel 740a whereas the disallowed material is directed through the outlet to a valve 734a which collects the disallowed material for some other end use. For example, for removal of selected specific sized ions, analytes or particulates, a first chamber 710 and associated graphene sheet is first exposed to the medium, wherein the first graphene sheet has larger sized diameter apertures and distribution than a second chamber 710a and associated graphene sheet which has smaller aperture diameters and distribution. If provided, additional chambers 710b-x would provide corresponding graphene sheets with further reductions in aperture size. In other words, the staged cross-flow chambers 710 can be arranged so that they are less selective of ions at a first chamber and progressively more selective of ions at downstream chambers. As a result, it is believed that much less work or pumping force is needed at each incremental stage to obtain a desired level of filtration for the medium. This is advantageous in that the apparatus provides much improved filtering with much lower required energy per incremental salt removal step.

A method for deionizing water carrying unwanted ions (201) comprises the steps of perforating a sheet of graphene (310) with plural apertures (such as 312) selected to allow the passage of water molecules and to disallow the passage of a selected one of the unwanted ions (Na, for example), to thereby generate perforated graphene (212). As an alternative, a graphene sheet so perforated may be provided. The water carrying unwanted ions (201) is pressurized (216, 218) to thereby generate pressurized water. The pressurized water is applied to a first (212u) surface of the perforated graphene (212), so that water molecules flow to a second side (212d) of the perforated graphene sheet in preference to ions. The water molecules (202) are collected at the second side (212d) of the graphene sheet. In one mode of this method, the selected one of the ions is chlorine, the apertures for disallowance of the chlorine ions are nominally of 0.9 nanometers diameter, and the apertures are nominally spaced apart by fifteen nanometers. In another mode of this method, the selected one of the ions is sodium, and the apertures for disallowance of the sodium ions of nominally 0.6 nanometers diameter, and the apertures' are nominally spaced apart by fifteen nanometers. The method may include the step of reinforcing the sheet of perforated graphene (212) with a backing (220), which may be a polytetrafluoroethylene grid (520).

A method for deionizing water (201) carrying unwanted ions comprises the steps of perforating a first sheet (612a) of graphene with plural apertures (312) of a diameter selected to disallow the passage of a selected first one of the unwanted ions (chlorine, for example), and to allow the passage of water molecules laden with a selected second one of the unwanted ions (sodium, for example), to thereby generate a first sheet of perforated graphene (612a). A second sheet of graphene (612b) is perforated with plural apertures selected to allow the passage of water molecules and to disallow the passage of the selected second one of the unwanted ions, to thereby generate a second sheet of perforated graphene (612b) in which the apertures have a smaller diameter than the apertures of the first sheet (612a) of perforated graphene. The first (612a) and second (612b) sheets of perforated graphene are juxtaposed, to thereby form a juxtaposed sheet with a first side defined by the first sheet (612a) of perforated graphene, a second side defined by the second sheet (612b) of perforated graphene, and a path (629) for the flow of liquid therebetween. The water carrying unwanted ions is applied to the first side (612a) of the juxtaposed sheet, so that water molecules flow through the juxtaposed sheet (612a) and the path (629) to the second side of the juxtaposed sheet in preference to ions, to thereby produce nominally deionized water. The nominally deionized water molecules are collected from the second side (612b) of the juxtaposed sheet.

A water deionizer comprises a graphene sheet (212) perforated with apertures (312) dimensioned to allow the flow of water molecules and to disallow the flow of ions of a particular type (sodium, for example). A source of water laden with ions of the particular type is provided. A path (210, 226, 227) is provided for the flow of the water laden with ions of the particular type through the graphene sheet perforated with apertures (212). In a particular embodiment of this deionizer, a purge arrangement (220,232) is coupled to the path for the flow, for diverting the flow away from the graphene sheet perforated with apertures (212).

A separator (600) comprises a first graphene sheet perforated with apertures dimensioned to allow the flow of water molecules and to disallow the flow of ions of a first type (612a), and a second graphene sheet perforated with apertures dimensioned to allow the flow of water molecules and to disallow the flow of ions of a second type (612b), where the ions of the second type (Na) are smaller than the ions of the first type (C1). A source (210, 216, 218) is provided of water laden with ions of the first and second types (201). A path (210, 626a) is provided for applying a flow of the water laden with ions of the first and second types (201) to the first graphene sheet perforated with apertures dimensioned to disallow the flow of the ions of the first type (612a). As a result, (a) ions of the first type (C1) accumulate on an upstream side (626a) of the first graphene sheet perforated with apertures dimensioned to disallow the flow of the ions of the first type (626a) and (b) water laden with ions of the second type (Na) flows through the first graphene sheet perforated with apertures dimensioned to disallow the flow of the ions of the first type (626a) to a downstream side (629) of the first graphene sheet perforated with apertures dimensioned to disallow the flow of the ions of the first type (612a). The separator (600) further comprises a path (629) for applying a flow of the water laden with ions of the second type to an upstream side of the graphene sheet perforated with apertures dimensioned to disallow the flow of the ions of the first type (612b). As a result, (a) ions of the second type accumulate on an upstream side (629) of the second graphene sheet perforated with apertures dimensioned to disallow the flow of the ions of the second type (612b) and (b) water free of the ions of the first and second types flows through the second graphene sheet perforated with apertures dimensioned to disallow the flow of the ions of the second type (612b). A collection arrangement (222, 224) is coupled to receive the water free of the ions of the first and second types (202). A further collection arrangement (630a, 632a, 634a; 630b, 632b, 634b) may be provided for separately collecting accumulations of ions.

A method for deionizing fluid carrying unwanted ions, comprises the steps of providing at least one sheet of graphene with plural perforated apertures selected to allow the passage of fluid and to disallow the passage of at least one of the unwanted ions, forming the at least one sheet of graphene into a cylindrical form, inserting the cylindrical form into a housing, pressurizing the fluid carrying unwanted ions to thereby generate pressurized fluid to flow through the housing, applying the pressurized fluid to a first surface of the perforated graphene in the cylindrical form, so that fluid flows to a second side of the at least one perforated graphene sheet in cylindrical form in preference to ions, and collecting the fluid from the second side of the at least one graphene sheet. The method continues wherein at least one ion is chlorine and the apertures for disallowance of the chlorine ions are nominally 0.9 nanometers and the apertures are nominally spaced apart by 15 nanometers. The method further continues wherein at least one ion is sodium, and the apertures for disallowance of the sodium ions is nominally 0.6 nanometers and the apertures are nominally spaced apart by 15 nanometers. The method may also provide a second set of at least one graphene sheet with plural perforated apertures selected to allow the passage of fluid and to disallow the passage of another one or more of the unwanted ions, forming the second set of at least one graphene sheet into a second cylindrical form, inserting the cylindrical form into a second housing, pressurizing the fluid carrying unwanted ions from the housing to thereby generate pressurized fluid to flow through the second housing, and applying the pressurized fluid to a first surface of the second set of said at least one perforated graphene sheet in the second cylindrical form, so that fluid flows to a second side of the second set of said at least one perforated graphene sheet in the second cylindrical form in preference to ions. The method continues wherein the perforated apertures of the at least one sheet of graphene for disallowance of unwanted chlorine ions are nominally 0.9 nanometers, and the perforated apertures of the second set of said at least one graphene sheet for disallowance of unwanted sodium ions are nominally 0.6 nanometers. The method may also provide for the first housing being less selective of ion exclusion than the second housing.

A fluid deionizer comprises a cylindrical form of at least one graphene sheet perforated with apertures dimensioned to allow the flow of fluid and to disallow the flow of ions of at least one particular type, a source of fluid laden with ions of the particular type, and a path for the flow of the fluid laden with ions of the at least one particular type through the cylindrical form of at least one graphene sheet perforated with apertures. The deionizer may further include a second cylindrical form of at least one graphene sheet perforated with apertures dimensioned to allow the flow of fluid and to disallow the flow of ions of another particular type, wherein the second cylindrical form is in the path for the flow of the fluid. The cylindrical forms of at least one graphene sheet are either rolled or spiral-wound. The deionizer further includes a purge valve associated with each cylindrical form and the path for the flow of the fluid to allow concentrated ions disallowed by the cylindrical forms to flow to collecting vessels.

A fluid deionizer also includes at least one graphene sheet perforated with apertures dimensioned to allow a flow of fluid and to disallow at least one particular type of ion contained in the flow of fluid, a support chamber carrying the at least one graphene sheet, the support chamber having an upstream portion that receives the at least one graphene sheet, a source of fluid laden with the at least one particular type of ion, a path for the flow of the fluid laden with the at least one particular type of ion through the at least one graphene sheet perforated with apertures, and a purge valve associated with the upstream portion, the purge valve placed in an open position so as to collect the at least one particular type of ion disallowed by the at least one graphene sheet. The fluid deionizer may include a porous media backing the at least one graphene sheet perforated with apertures. The media is selected from the group consisting of polytetrafluoroethylene, polytetrafluoroethane, polycarbonate, nanostructured carbon or sintered porous metals. The deionizer may provide a second at least one graphene sheet perforated with apertures dimensioned to allow the flow of fluid and to disallow another particular type of ion contained in the flow of fluid, wherein the support chamber carries the second at least one graphene sheet so as to form an intermediate chamber between the at least one graphene sheet and the second at least one graphene sheet, and a downstream chamber underneath the second at least one graphene sheet such that the downstream chamber collects the flow of fluid without the particular types of ions disallowed by the graphene sheets. The fluid deionizer may have a second purge valve, wherein the second purge valve is associated with an intermediate chamber and when placed in an open position collects another particular type of ion disallowed by the second at least one graphene sheet. The deionizer may further include a cross-flow valve associated with the upstream portion, the purge valve and the cross-flow valve opened and closed simultaneously to aid in purging the disallowed type of ion from the support chamber.

A method for separating components from a medium includes the steps of providing a primary sheet of at least one layer of graphene with plural perforated apertures selected to allow the passage of a medium and to disallow the passage of selected components in the medium, providing the primary sheet of at least one layer of graphene in a primary chamber. The primary chamber includes a primary inlet, a primary outlet, and a primary lower flow path. The method continues by pressurizing the medium to flow in a path substantially parallel to the primary sheet of at least one layer of graphene from the primary inlet to the primary outlet, wherein the medium flows on to a first surface of the primary sheet of at least one layer of graphene so that a portion of the medium flows to a second side of the primary sheet of at least one layer of graphene through the plural perforated apertures while a remaining portion of the medium and the disallowed selected components in the medium flow out the primary outlet. The method continues with providing the plural perforated apertures in a range of 0.6 to 1.2 nanometers for purposes of sodium and chlorine deionization. The method may also provide the plural perforated apertures of a size to selectively disallow any selected component selected from the group consisting of ions, particulates, analytes, gases, and hydrocarbons. The method also provides a supporting membrane on a side of the primary sheet of at least one layer of graphene opposite the flow path, the supporting membrane selected from the group consisting of polytetrafluoroethylene, perforated polycarbonate film, and sintered porous metal. The method further yet provides for connecting the primary outlet to a secondary separation apparatus and providing the secondary apparatus with a second sheet of at least one layer of graphene with plural perforated apertures selected to allow the passage of the medium received from the outlet and to disallow the passage of selected components in the medium, providing the second sheet of at least one layer of graphene in a second chamber, the second chamber having a corresponding inlet, outlet, and lower flow path, and pressurizing the medium received from the primary outlet through the secondary inlet to flow in a path substantially parallel to the second sheet of at least one layer of graphene from the secondary inlet to the secondary outlet, the medium flowing on to a first surface of the second sheet of at least one layer of graphene so that a portion of the medium flows to a second side of the second sheet at least one layer of graphene through the plural perforated apertures while a remaining portion of the medium and the disallowed selected components in the medium flow out the secondary outlet.

A separation apparatus comprises at least one chamber having an inlet, an outlet and a lower flow path, at least one sheet of graphene perforated with apertures dimensioned to allow passage of a medium and to disallow passage of selected components in the medium, the at least one sheet of graphene positioned in the at least one chamber, and a pressurized source of the medium connected to the at least one chamber having an inlet, the pressurized source directing the medium along a path substantially parallel to the at least one sheet of graphene from the inlet to the outlet, the medium flowing on to a first surface of the at least one sheet of graphene so that a portion of the medium flows to a second side of the at least one graphene sheet through the plural perforated apertures while a remaining portion of the medium and the disallowed selected components in the medium flow out the outlet. The apparatus may further include the plural perforated apertures sized in a range of 0.6 to 1.2 nanometers. A supporting membrane may be provided on a side of the at least one sheet of graphene opposite the flow path, wherein the supporting membrane is selected from the group consisting of polytetrafluoroethylene, perforated polycarbonate film, and sintered porous metal. The apparatus may include an additional chamber serially connected to the outlet of the at least one chamber, wherein the additional chamber incrementally removes specific components from the medium by utilizing a corresponding at least one graphene sheet that has a smaller aperture diameter than the preceding chamber. The apparatus may also include an additional chamber serially connected to the outlet of the at least one chamber, wherein the additional chamber allows incrementally lower pressure from an additional pressurized source connected to the outlet of the preceding chamber by utilizing a corresponding at least one graphene sheet in the additional chamber that utilizes more selective ion exclusion.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A separation apparatus, comprising:
   a housing;
   at least one first sheet of graphene, within the housing, with plural perforated apertures having a desired size to allow passage of a fluid and to disallow passage of selected components in the fluid, said at least one first sheet of graphene having a first side and a second side opposite the first side;
   a source of said fluid directing said fluid along a flow path substantially parallel to said at least one first sheet of graphene, the fluid flowing on to a first surface of the first side of said at least one first sheet of graphene so that a portion of the fluid flows to the second side of said at least one first sheet of graphene through said plural perforated apertures while the disallowed selected components in the fluid are prevented from flowing through the perforated apertures,
   wherein a length of a flow path through the apertures of a sheet of the at least one first sheet of graphene is equal to a thickness of the sheet of the at least one first sheet of graphene; and
   at least one second sheet of graphene, within the housing, and separated from the at least one first sheet of graphene, allowing the passage of fluid passing through the first sheet of graphene to pass through the second sheet of graphene and disallow passage of second selected components;
   wherein apertures in the at least one first sheet of graphene have a different size than apertures in the at least one second sheet of graphene; wherein the housing is provided with a fluid inlet and fluid outlets for removing the disallowed components and the fluid treated.

2. The apparatus according to claim 1, wherein said plural perforated apertures are sized in a range of 0.6 to 1.2 nanometers.

3. The apparatus according to claim 1, further comprising:
   a supporting membrane on a side of said at least one first sheet of graphene opposite said flow path, said supporting membrane selected from the group consisting of polytetrafluoroethylene, perforated polycarbonate film, and sintered porous metal, said supporting membrane perforated with a plurality of apertures.

4. The apparatus according to claim 1, wherein said apertures are nominally spaced apart by 15 nanometers.

5. The apparatus according to claim 1, wherein the selected components comprise at least one of gasses, particulates, solutes, molecules, or hydrocarbons.

6. The apparatus according to claim 1, wherein said source of said fluid is configured to provide a pressurized flow of said fluid.

7. A method for separating selected components from a fluid, comprising:
   directing said fluid to at least one first sheet of graphene, said at least one first sheet of graphene with plural perforated apertures having a desired size to allow passage of the fluid and to disallow passage of the selected components in the fluid, said at least one first sheet of graphene having a first side and a second side opposite the first side; and
   directing said fluid along a flow path substantially parallel to said at least one first sheet of graphene, the fluid flowing on to a first surface of the first side of said at least one first sheet of graphene so that a portion of the fluid flows to the second side of said at least one first sheet of graphene through said plural perforated apertures while the disallowed selected components in the fluid are prevented from flowing through the perforated apertures,
   wherein a length of a flow path through the apertures of a sheet of the at least one first sheet of graphene is equal to a thickness of the sheet of the at least one first sheet of graphene;
   at least one second sheet of graphene being within a same housing and separated from the at least one first sheet of graphene, allowing the passage of fluid passing through the first sheet of graphene to pass through the second sheet of graphene and disallow passage of second selected components;
   wherein apertures in the at least one first sheet of graphene have a different size than apertures the at least one second sheet of graphene; and
   removing the fluid passing through the at least one second sheet of graphene, and the disallowed components from the first and second graphene sheets.

8. The method according to claim 7, wherein said plural perforated apertures are sized in a range of 0.6 to 1.2 nanometers.

9. The method according to claim 7, wherein a supporting membrane is disposed on a side of said at least one first sheet of graphene opposite said flow path, said supporting membrane selected from the group consisting of polytetrafluoroethylene, perforated polycarbonate film, and sintered porous metal, said supporting membrane perforated with a plurality of apertures.

10. The method according to claim 7, wherein said apertures are nominally spaced apart by 45 nanometers.

11. The method according to claim 7, wherein the selected components comprise at least one of gasses, particulates, solutes, molecules, or hydrocarbons.

12. The method according to claim 7, wherein directing said fluid along a flow path comprises directing a pressurized fluid.

13. A separation apparatus, comprising:
    a housing;
    at least one first sheet of graphene, within the housing, with plural perforated apertures having a desired size to allow passage of a fluid and to disallow passage of selected components in the fluid, said at least one first sheet of graphene having a first side and a second side opposite the first side;
    a source of said fluid directing said fluid along a flow path, the fluid flowing on to a first surface of the first side of said at least one first sheet of graphene so that a portion of the fluid flows to the second side of said at least one first sheet of graphene through said plural perforated apertures while the disallowed selected components in the fluid are prevented from flowing through the perforated apertures, wherein a length of a flow path through the apertures of a sheet of the at least one first sheet of graphene is equal to a thickness of the sheet of the at least one first sheet of graphene; and at least one second sheet of graphene within the housing, and separated from the at least one first sheet of graphene, allowing the passage of fluid passing through the first sheet of graphene to pass through the second sheet of graphene and disallow passage of second selected components;

wherein apertures in the at least one first sheet of graphene have a different size than apertures in the at least one second sheet of graphene; wherein the housing is provided with a fluid inlet and fluid outlets for removing the disallowed components and the fluid treated.

14. A method for separating selected components from a fluid, comprising:

directing said fluid to at least one sheet of graphene, said at least one first sheet of graphene with plural perforated apertures having a desired size to allow passage of the fluid and to disallow passage of the selected components in the fluid, said at least one first sheet of graphene having a first side and a second side opposite the first side;

directing said fluid along a flow path, the fluid flowing on to a first surface of the first side of said at least one first sheet of graphene so that a portion of the fluid flows to the second side of said at least one first sheet of graphene through said plural perforated apertures while the disallowed selected components in the fluid are prevented from flowing through the perforated apertures;

wherein a length of a flow path through the apertures of a sheet of the at least one sheet of graphene is equal to a thickness of the sheet of the at least one first sheet of graphene;

providing at least one second sheet of graphene within a same housing as, and separated from, the at least one first sheet of graphene, allowing the passage of fluid passing through the first sheet of graphene to pass through the second sheet of graphene and disallow passage of second selected components;

wherein apertures in the at least one first sheet of graphene have a different size than apertures in the at least one second sheet of graphene; and removing the fluid passing through the at least one second graphene sheet, and the disallowed components from the first and second at least one graphene sheets.

* * * * *